(12) United States Patent
Kanou et al.

(10) Patent No.: US 6,407,784 B1
(45) Date of Patent: Jun. 18, 2002

(54) REFLECTION TYPE LIQUID CRYSTAL DISPLAY AND METHOD OF FABRICATING THE SAME

(75) Inventors: Hiroshi Kanou; Yuichi Yamaguchi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/281,073

(22) Filed: Mar. 9, 1999

(30) Foreign Application Priority Data

Mar. 11, 1998 (JP) .......................................... 10-059475

(51) Int. Cl.[7] ........................ G02F 1/1333; G02F 1/136
(52) U.S. Cl. .............................. 349/113; 349/43; 349/51
(58) Field of Search ............................ 349/113, 43, 51, 349/165

(56) References Cited

U.S. PATENT DOCUMENTS

| | | | |
|---|---|---|---|
| 5,500,750 A | * 3/1996 | Kanbe et al. | 359/58 |
| 5,526,149 A | * 6/1996 | Kanbe et al. | 359/70 |
| 5,691,791 A | * 11/1997 | Nakamura et al. | 349/113 |
| 5,805,252 A | * 9/1998 | Shimada et al. | 349/113 |
| 6,097,458 A | * 8/2000 | Tsuda et al. | 349/113 |

FOREIGN PATENT DOCUMENTS

| | | |
|---|---|---|
| JP | 59-71081 | 4/1984 |
| JP | 61-6390 | 2/1986 |
| JP | 5-1736158 | 7/1993 |
| JP | 6-11711 | 1/1994 |
| JP | 6-27481 | 2/1994 |
| JP | 6-75237 | 3/1994 |
| JP | 6-75238 | 3/1994 |
| JP | 6-273800 | 9/1994 |
| JP | 6-342153 | 12/1994 |
| JP | 9-54318 | * 2/1997 |

OTHER PUBLICATIONS

T. Koizumi et al., "Reflective Multicolor LCD (II): Improvement in the Brightness", *Proceedings of the SID*, vol. 29, No. 2, 1988, pp. 157–160.

* cited by examiner

*Primary Examiner*—William L. Sikes
*Assistant Examiner*—Mike Qi
(74) *Attorney, Agent, or Firm*—Sughrue Mion, PLLC

(57) ABSTRACT

There is provided a reflection type liquid crystal display including (a) a first substrate, (b) a second substrate having a transparent electrode formed thereon in facing relation to the first substrate, and (c) a liquid crystal layer sandwiched between the first and second substrates, the first substrate including (a1) an insulating substrate, (a2) a switching device fabricated on the insulating substrate, (a3) at least one projection projecting towards the second substrate and formed on the insulating substrate in a line with the switching device, (a4) a first insulating film covering both the switching device and the projection therewith and having first raised and recessed portions formed in accordance with height of the switching device and the projection, and (a5) a light-reflective plate formed over the first insulating film and having second raised and recessed portions formed over the first raised and recessed portions, the switching device being in electrical connection with the light-reflective plate through a drain or source electrode thereof. The above-mentioned liquid crystal display has superior display ability and can be fabricated in simpler steps.

27 Claims, 22 Drawing Sheets

FORMATION OF GATE ELECTRODE (1 PR)

FORMATION OF INSULATING FILM AND SEMICONDUCTOR FILM

PATTERNING SEMICONDUCTOR FILM (2PR)

FORMATION OF SOURCE AND DRAIN ELECTRODES (3PR)

FORMATION OF PASSIVATION

FORMATION OF INSULATING FILM (4PR)

FORMATION OF CONTACT HOLE (5PR)

FORMATION OF LIGHT-REFLECTIVE ELECTRODE PLATE (6PR)

REFLECTION TYPE LIQUID CRYSTAL DISPLAY AND METHOD OF FABRICATING THE SAME

BACKGROUND OF THE INVENTION

1. Field of the Invention

The invention relates to a reflection type liquid crystal display and a method of fabricating the same.

2. Description of the Related Art

A reflection type liquid crystal display includes a light-reflection plate therein, and reflects external lights entering the liquid crystal display, at the light-reflection plate. The thus reflected external lights are used as a light source. Hence, a reflection type liquid crystal display does not need backlight as a light source. For this reason, a reflection type liquid crystal display is generally adopted as a display in a portable terminal device such as a pager. A reflection type liquid crystal display is superior to a transmission type liquid crystal display with respect to power consumption, thickness, and weight.

A reflection type liquid crystal display includes a light-reflection plate therein, and reflects external lights entering the liquid crystal display, at the light-reflection plate. The thus reflected external light is used as a light source. Hence, a reflection type liquid crystal display does not need backlight as a light source. For this reason, a reflection type liquid crystal display is generally adopted as a display in a portable terminal device such as a pager. A reflection type liquid crystal display is superior to a transmission type liquid crystal display with respect to power consumption, thickness, and weight.

FIG. 1 is a cross-sectional view illustrating a structure of a conventional reflection type liquid crystal display.

The illustrated conventional liquid crystal display 10 is comprised of a lower substance 1A, an upper substrate 1B facing the lower substrate 1A, and a liquid crystal layer 14 sandwiched between the lower and upper substrate 1A and 1B. For instance, the liquid crystal layer 14 contains GH liquid crystal. In this specification, the upper substrate 1B is a substrate through which external lights pass and on which characters such as figures and letters are displayed by reflected external lights, and the lower substrate 1A is a substrate at which external lights having passed through the upper substrate 1B are reflected.

The lower substrate 1A is comprised of a glass substrate 2A, a thin film transistor 6 acting as an active matrix drive device, formed on the glass substrate 2A, and having a reverse stagger structure, an interlayer insulating film 11 formed over the thin film transistor 6 and composed of polyimide, and a light-reflective electrode plate 24 in electrical connection with a source electrode 21 or a drain electrode 22 of the thin film transistor 6, acting as a light-reflective plate and a pixel electrode.

The upper electrode 1B is comprised of a glass substrate 2B, a color filter 3 formed on the glass substrate 2B, and a transparent electrode 4 formed over the color filter 3.

In the illustrated reflection type liquid crystal display 10, external light 15 pass through the glass substrate 2B, the color filter 3, the transparent electrode 4, and the liquid crystal layer 14, and are reflected at the light-reflective electrode plate 24. The reflection type liquid crystal display 10 uses the thus reflected light 16 as a light source.

The reflection type liquid crystal display 10 is required to present bright and white display when a light is transmitted through the liquid crystal layer 14. To meet with this requirement, it is necessary for the reflection type liquid crystal display 10 to reflect the external light 15 having passed through the upper electrode 1B in various directions, outwardly through the upper electrode 1B. Hence, the polyimide film 11 is designed to have raised and recessed portions at a surface thereof to thereby form similar raised and recessed portions at a surface of the light-reflective electrode plate 24 formed on the polyimide film 11. A shape of the raised and recessed portions of the polyimide film 11 is a key for determining display performance of the reflection type liquid crystal display 10.

A method of fabricating the reflection type liquid crystal display 10 is explained hereinbelow with reference to FIGS. 2A to 2H. In FIGS. 2A to 2H, the term "PR" means that photolithography is carried out in that step, and a figure at the head of the term "PR" means a total number of photolithography steps. For instance, "2PR" means that the second photolithography is carried out in the step illustrated in an associated Figure.

First, as illustrated in FIG. 2A, a gate electrode 17 is formed on a glass substrate 2.

Then, as illustrated in FIG. 2B, an insulating film 18, a semiconductor layer 19, and a doped layer 20 are formed in this order over the glass substrate 2.

Then, as illustrated in FIG. 2C, the semiconductor layer 19 and the doped layer 20 are patterned to thereby form an island on the insulating film 18.

Then, as illustrated in FIG. 2D, a source electrode 21 and a drain electrode 22 are formed around the island to thereby fabricate a transistor.

Then, as illustrated in FIG. 2E, an insulating film 18 is deposited entirely over the product.

Then, an organic insulating film 25 is deposited entirely over the insulating film 18, and is patterned so as to form raised and recessed portions 26 above a region where a light-reflective plate is to be formed, as illustrated in FIG. 2F.

Then, as illustrated in FIG. 2G, there is formed a contact hole 23 reaching the source electrode 21 through the organic insulating film 25 and the insulating film 18.

Then, as illustrated in FIG. 2H, the light-reflective electrode plate 24 is formed over the organic insulating film 25 so that the contact hole 23 is filled with the material of which the reflection type liquid crystal display 10 is composed.

As shown in FIGS. 2A, 2C, 2D, 2F, 2G and 2H, photolithography is carried out six times in the method.

The method having been explained with reference to FIGS. 2A to 2H is suggested in Japanese Patent Publication No. 61-6390, and by T. Koizumi and T. Uchida in Proceedings of the SID, Vol. 29, pp. 157, 1988.

In order to fabricate a reflection type liquid crystal display capable of presenting bright and high-grade display, it has been conventionally necessary to form a high-performance switching device and a high-performance reflective plate on a common insulating substrate. The formation of them on a common substrate requires carrying out a lot of steps for film deposition, photolithography steps, and etching steps. Accordingly, the conventional method of fabricating a reflection type liquid crystal display cannot avoid including a lot of fabrication steps, taking much time, and needing much cost.

Japanese Unexamined Patent Publication No. 6-75238 has suggested a method of fabricating a reflection type liquid crystal display, including the steps of fabricating a thin film transistor on a substrate, forming an organic insulating film entirely over the substrate and the transistor, concurrently forming a contact hole, and a raised portion, and forming a reflective electrode over the contact hole and the raised portion. A drain electrode of the transistor is electrically connected to the reflective electrode through the contact hole.

Japanese Unexamined Patent Publication No. 6-273800 has suggested a reflection type liquid crystal display. In the suggested reflection type liquid crystal display, a gate bus, a source bus, and a thin film transistor are formed on a substrate. An organic insulating film having raised portions is formed over the substrate, covering the thin film transistor therewith. A light-impermeable film is formed on the organic insulating film above the thin film transistor, and a reflective electrode is formed above a region other than the thin film transistor. A gap is formed between the reflective electrode and the light-impermeable film. An alignment film is formed over the product. A liquid crystal layer is sandwiched between the substrate and another substrate on which a color filter, an electrode, and an alignment film are formed.

Japanese Unexamined Patent Publication No. 6-342153 has suggested a reflection type liquid crystal display. In the suggested reflection type liquid crystal display, an insulating film to be formed between a reflective electrode and a thin film transistor is designed to have light-absorptive characteristic and/or light-scattering characteristic. Thus, it is no longer necessary to use a black mask which has been absolutely necessary for fabricating a reflection type liquid crystal display.

Japanese Unexamined Patent Publication No. 9-54318 has suggested a method of fabricating a reflection type liquid crystal display. The method includes the steps of forming a thin film transistor on an insulating substrate, forming an insulating film over the insulating substrate, and forming a light-reflective plate over the insulating film so that the light-reflective plate is electrically connected to the thin film transistor. The light-reflective plate is designed to have raised and recessed portions at a surface thereof. Those raised and recessed portions are formed at the same time when a gate electrode, a gate insulating film, and a semiconductor layer are etched for forming an island.

SUMMARY OF THE INVENTION

It is an object of the present invention to provide a reflection type liquid crystal display which is capable of providing high brightness and high quality display in the decreased number of fabrication steps.

It is also an object of the present invention to provide a method of fabricating such a reflection type liquid crystal display.

In one aspect of the present invention, there is provided a reflection type liquid crystal display including (a) a first substrate, (b) a second substrate having a transparent electrode formed thereon in facing relation to the first substrate, and (c) a liquid crystal layer sandwiched between the first and second substrates, the first substrate including (a1) an insulating substrate, (a2) a switching device fabricated on the insulating substrate, (a3) at least one projection projecting towards the second substrate and formed on the insulating substrate in a line with the switching device, (a4) a first insulating film covering both the switching device and the projection therewith and having first raised and recessed portions formed in accordance with height of the switching device and the projection, and (a5) a light-reflective plate formed over the first insulating film and having second raised and recessed portions formed over the first raised and recessed portions, the switching device being in electrical connection with the light-reflective plate.

It is preferable that the switching device has the same height as a height of the projection.

It is also preferable that the first insulating film has a portion on the projection, the portion having a cross-sectional area decreasing towards the second substrate.

The first insulating film may be composed of inorganic or organic material. However, it is preferable that the first insulating film is composed of photosensitive material. By composing the first insulating film of photosensitive material, it is possible to pattern the first insulating film directly by a step of exposing the first insulating film to a light and a step of developing the same. Hence, a photoresist step, an etching step, and a photoresist removal step, which were necessary to carry out in a conventional method of fabricating a reflection type liquid crystal display, can be all omitted, resulting in reduction in the number of fabrication steps.

It is preferable that the light-reflective plate is formed only above the projection. The light-reflective plate is generally composed of metal having a high reflectance ratio.

It is preferable that the projection is formed to be pillar-shaped, in which case, the projection is preferably spaced away from adjacent projection by a distance in the range of 3 $\mu$m to 20 $\mu$m both inclusive in a plane parallel to the first substrate. As an alternative, the projection may be formed to be strip-shaped.

It is preferable that the projection has a height in the range of 0.4 $\mu$m to 4 $\mu$m both inclusive. It is also preferable that the first insulating film has a thickness in the range of 0.6 $\mu$m to 4 $\mu$m both inclusive.

For instance, the switching device may be comprised of a thin film transistor, in which case, the transistor may be of forward stagger type or of reverse stagger type. As an alternative, the switching device may be comprised of a metal/insulator/metal (MIM) diode.

There is further provided a reflection type liquid crystal display including (a) a first substrate, (b) a second substrate having a transparent electrode formed thereon in facing relation to the first substrate, and (c) a liquid crystal layer sandwiched between the first and second substrates, the first substrate including (a1) an insulating substrate, (a2) a switching device fabricated on the insulating substrate, (a3) at least one projection projecting towards the second substrate and formed on the insulating substrate in a line with the switching device, (a4) a first insulating film formed on top of both the switching device and the projection, (a5) a second insulating film covering both the switching device and the projection therewith and having first raised and recessed portions formed in accordance with height of the switching device and the projection, and (a6) a light-reflective plate formed over the second insulating film and having second raised and recessed portions formed over the first raised and recessed portions, the switching device being in electrical connection with the light-reflective plate.

It is preferable that the first insulating film is tapered at a sidewall thereof, or rounded at a top thereof.

It is preferable that the switching device includes a third insulating film composed of the same material as that of the first insulating film, and that the projection has a multi-layered structure including at least one of a metal film, a fourth insulating film, and a semiconductor film, and the first insulating film formed thereon. The one of a metal film, a fourth insulating film, and a semiconductor film is composed of the same material as a material of which a layer constituting the switching device is composed.

The first insulating film may be composed of inorganic or organic material. However, it is preferable that the first insulating film is composed of photosensitive material. By composing the first insulating film of photosensitive material, it is possible to pattern the first insulating film directly by a step of exposing the first insulating film to a light and a step of developing the same. Hence, a photoresist step, an etching step, and a photoresist removal step, which were necessary to carry out in a conventional method of fabricating a reflection type liquid crystal display, can be all omitted, resulting in reduction in the number of fabrication steps.

It is preferable that the first insulating film is composed of thermally melting or contracting material.

In another aspect of the present invention, there is provided a method of fabricating a reflection type liquid crystal display, including the steps of (a) forming at least one of a metal film, a first insulating film, and a semiconductor film on an insulating substrate, (b) patterning the at least one of a metal film, a first insulating film, and a semiconductor film to thereby form a switching device and at least one projection on the insulating substrate, (c) forming a second insulating film covering both the switching device and the projection therewith and having first raised and recessed portions formed in accordance with height of the switching device and the projection, and (d) forming a light-reflective plate over the second insulating film, the light-reflective plate having second raised and recessed portions formed over the first raised and recessed portions.

It is preferable that the switching device is formed in the step (b) so that it has the same height as a height of the projection.

It is preferable that the second insulating film is formed in the step (c) so that a portion thereof on the projection has a cross-sectional area decreasing towards the second substrate.

The light-reflective plate may be formed preferably only above the projection in the step (d).

The projection may be formed in the step (b) to be pillar-shaped or strip-shaped.

There is further provided a method of fabricating a reflection type liquid crystal display, including the steps of (a) forming at least one of a metal film, a first insulating film, and a semiconductor film on an insulating substrate, (b) forming a second insulating film over the at least one of a metal film, a first insulating film, and a semiconductor film, (c) patterning both the second insulating film and the at least one of a metal film, a first insulating film, and a semiconductor film to thereby form a switching device and at least one projection on the insulating substrate, (d) forming a third insulating film covering both the switching device and the projection therewith and having first raised and recessed portions formed in accordance with height of the switching device and the projection, and (e) forming a light-reflective plate over the third insulating film, the light-reflective plate having second raised and recessed portions formed over the first raised and recessed portions.

It is preferable that the method further includes the step of tapering the second insulating film at a sidewall thereof. It is preferable that the method further includes the step of making the second insulating film rounded at a top thereof.

It is preferable that the switching device is formed in the step (c) so that it has the same height as a height of the projection.

The third insulating film may be formed in the step (d) so that a portion thereof on the projection has a cross-sectional area decreasing towards the second substrate.

The projection is comprised of either a film or films formed for fabricating an active matrix drive device or a transistor, or a combination such film or films and an insulating film acting as a mask to be used when any pattern for fabricating an active matrix drive device or a transistor is formed. The first (or second) insulating film is formed over the projection and the transistor so that the first (or second) insulating film has smooth raised and recessed portions. The light-reflective plate formed on the first (or second) insulating film would have raised and recessed portions which would reflect external lights in desired directions.

That is, it is possible to form a transistor and a projection in a common layer or common layers in a common step.

The projection may be formed pillar-shaped or strip-shaped. As a result, it is no longer necessary to form raised and recessed portions of different material in a separate step in a process for fabricating a transistor, ensuring reduction the number of fabrication steps.

The second raised and recessed portions of the light-reflective plate, on which display performance of a reflection type liquid crystal display is dependent, are dependent in shape on the projection or projections formed by a patterning step. Hence, the second raised and recessed portions can be controlled with respect to a shape, ensuring a reflection type liquid crystal display providing high brightness.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
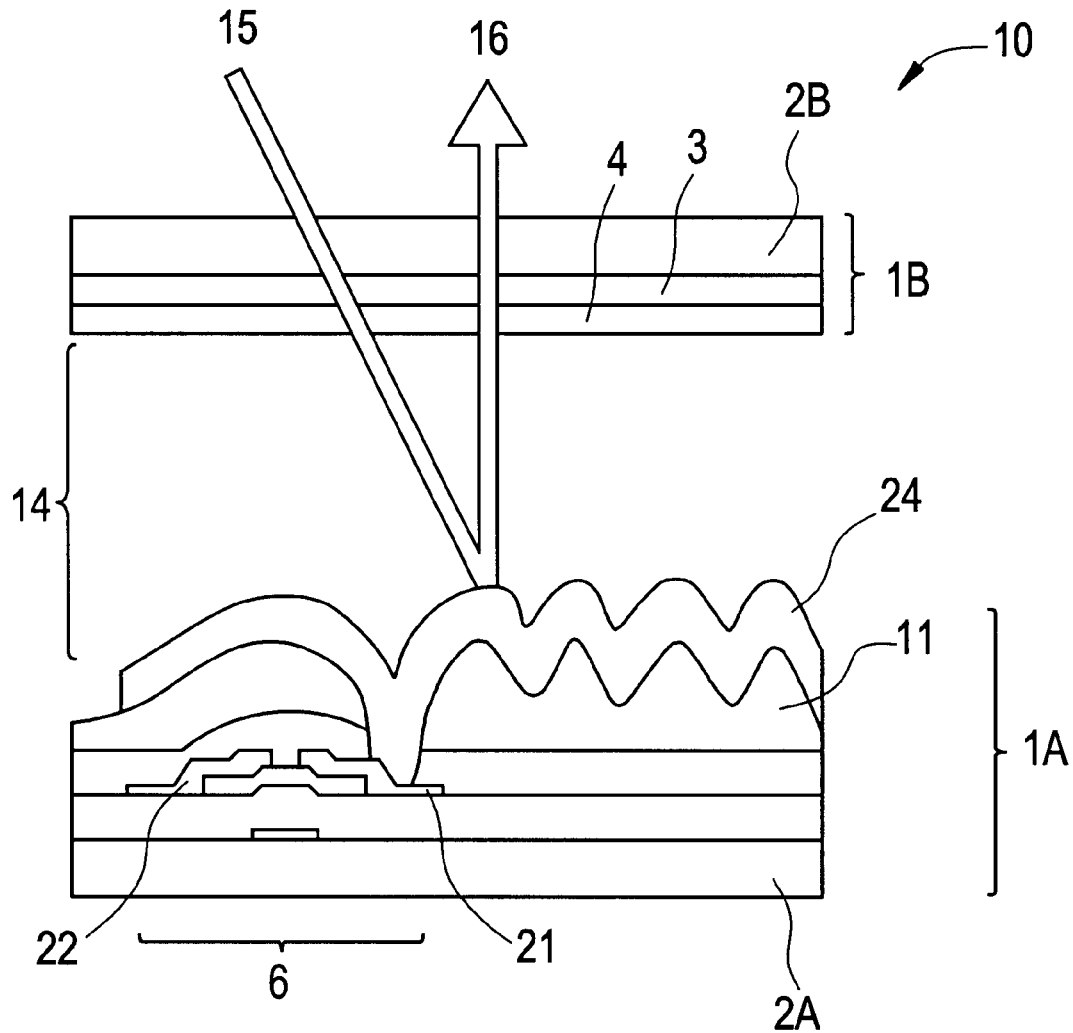
FIG. 1 is a cross-sectional view illustrating a conventional reflection type liquid crystal display.
Figure 2A:
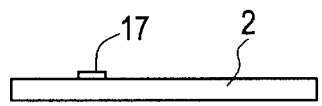
FIGS. 2A to 2H are cross-sectional views of a conventional reflection type liquid crystal display, illustrating respective steps of a method of fabricating the same.
Figure 2B:
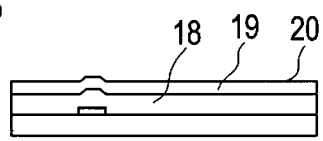
Figure 2C:
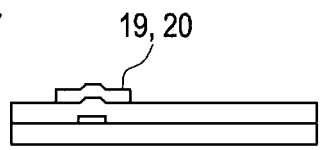
Figure 2D:
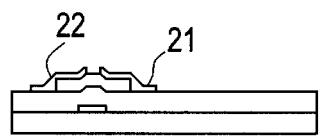
Figure 2E:
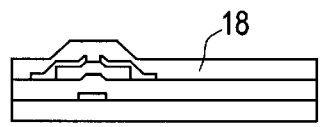
Figure 2F:
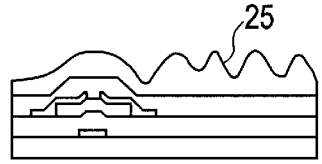
Figure 2G:
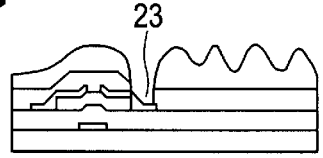
Figure 2H:
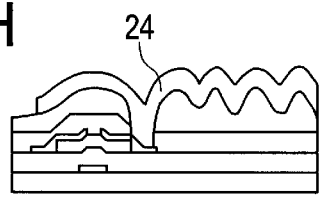

Preferred embodiments in accordance with the present invention will be explained hereinbelow with reference to drawings. Parts or elements that correspond to those of the conventional reflection type liquid crystal display illustrated in FIG. 1 have been provided with the same reference numerals.

[First Embodiment]

Figure 3:
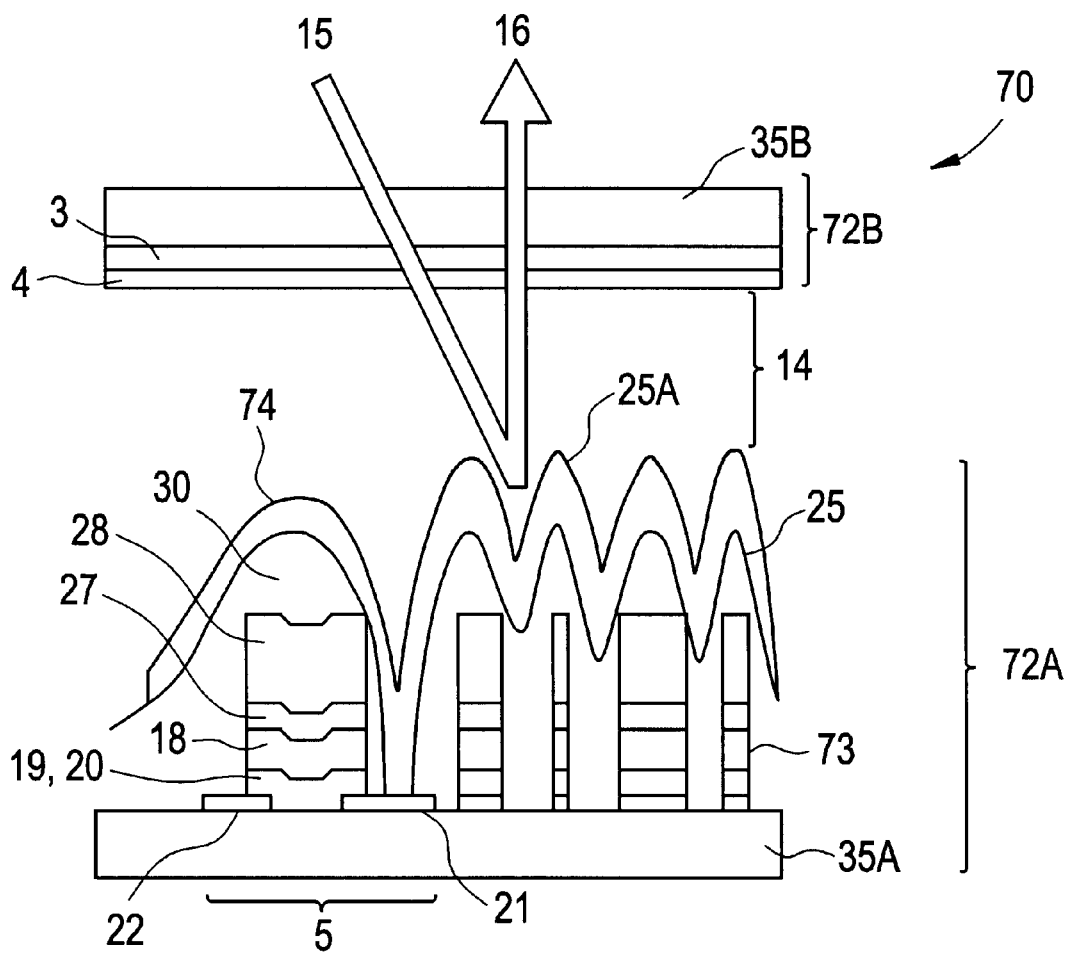
FIG. 3 is a cross-sectional view illustrating a reflection type liquid crystal display in accordance with the first embodiment of the invention.

FIG. 3 is a cross-sectional view illustrating a reflection type liquid crystal display in accordance with the first embodiment of the invention. The reflection type liquid crystal display includes a thin film transistor having a forward stagger structure.

The liquid crystal display 70 in accordance with the first embodiment is comprised of a lower substrate 72A, an upper substrate 72B in facing relation to the lower substrate 72A, and a GH liquid crystal layer 14 sandwiched between the lower and upper substrates 72A and 72B.

The lower substrate 72A is comprised of an insulating substrate 35A, an active matrix drive device 5 formed on the insulating substrate 35A, a plurality of pillar-shaped projections 73 standing on the insulating substrate 35A in line with the active matrix drive device 5, a first insulating film 28 formed on top of the active matrix drive device 5, a second insulating film 30 covering the active matrix drive device 5 and the pillar-shaped projections 73 therewith, and a light-reflective electrode plate 74 formed entirely over the second insulating film 30 and composed of metal having a high reflectance ratio.

The active matrix drive device 5 is a thin film transistor having a forward stagger structure and comprised of a source electrode 21 formed on the insulating substrate 35A, a drain electrode 22 formed on the insulating substrate 35A, a semiconductor layer 19, a doped layer 20, an insulating layer 18, and a metal layer 27, the layers 19, 20, 18 and 27 being formed on the insulating substrate 35A in this order.

The first insulating file 28 is formed at a surface thereof with first raised and recessed portions 25 originated by the active matrix drive device 5 and the pillar-shaped projections 73. The first raised and recessed portions 25 are designed to have a relatively great radius of curvature. The second insulating film 30 formed over the first insulating film 28 is also formed at a surface thereof with second raised and recessed portions 25A. The first raised and recessed portions 25 are reflected in the second raised and recessed portions 25A with respect to a shape. The second raised and recessed portions 25A reflect and scatter incident light 15.

The light-reflective electrode plate 74 is electrically connected to the source electrode 21 of the thin film transistor 5, and acts as both a reflective plate and a pixel electrode.

The upper electrode 72B is comprised of an insulating substrate 35B, a color filter 3 formed on the insulating substrate 35B, and a transparent electrode 4 formed over the color filter 3. The transparent electrode 4 faces the lower substrate 72A.

Hereinbelow is explained the operation of the reflection type liquid crystal display 70 in accordance with the first embodiment.

While the reflection type liquid crystal display 70 is in light-permeable condition, the external lights 15 having passed through the upper substrate 72B pass through the GH liquid crystal layer 14, and are reflected at the second raised and recessed portions 25A of the light-reflective electrode plate 74 in accordance with orientation which is dependent on a shape of the second raised and recessed portions 25A. The thus reflected lights 16 pass again through the GH liquid crystal layer 14 and then the upper substrate 72B. Thus, an operator can see the reflected lights 16.

While the reflection type liquid crystal display 70 is in light-impermeable condition, the external lights 15 having passed through the upper substrate 72B are all absorbed into the GH liquid crystal layer 14 before reaching the light-reflective electrode plate 74. Accordingly, the external lights 15 do not pass through the upper electrode 72B. As a result, the reflection type liquid crystal display 70 has a display screen with high contrast and high brightness.

In the first embodiment, the second raised and recessed portions 25A of the light-reflective electrode plate 74 can be formed by depositing the second insulating film 30 over the first insulating film 28 having the first raised and recessed portions 25. The first raised and recessed portions 25 can be formed at the same time when the thin film transistor 5 is formed in photolithography and etching steps. Thus, the reflection type liquid crystal display 70 in accordance with the first embodiment can be fabricated in the less number of fabrication steps than the number of fabrication steps in a conventional method of fabricating a reflection type liquid crystal display.

The projections 73 may be formed of at least one of the metal layer 27, the gate insulating layer 18, the semiconductor layer 19, and the doped layer 20, all of which have been formed when the thin film transistor 5 was fabricated on the insulating substrate 35A, and the first insulating film 28.

As an alternative, the first insulating film 28 may not be formed. The second insulating film 30 may be formed directly covering the thin film transistor 5 therewith.

[Second Embodiment]

Figure 4:
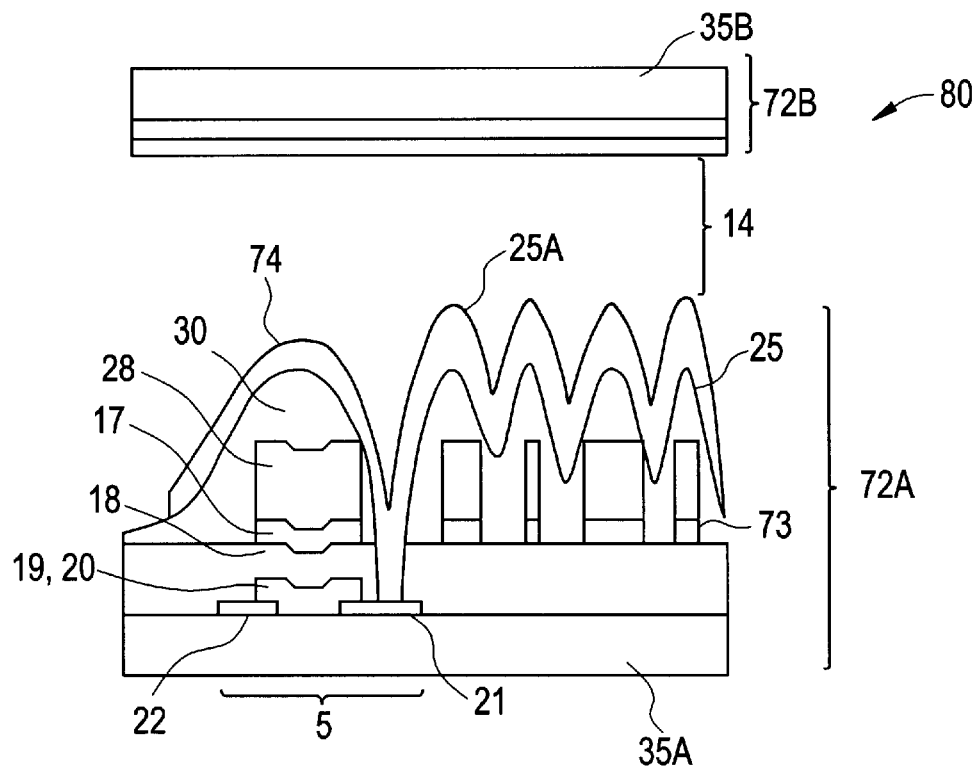
FIG. 4 is a cross-sectional view illustrating a reflection type liquid crystal display in accordance with the second embodiment of the invention.

FIG. 4 is a cross-sectional view illustrating a reflection type liquid crystal display in accordance with the second embodiment of the invention.

The liquid crystal display 80 in accordance with the second embodiment is comprised of a lower substrate 72A, an upper substrate 72B in facing relation to the lower substrate 72A, and a GH liquid crystal layer 14 sandwiched between the lower and upper substrates 72A and 72B.

In the second embodiment, the insulating film 18 of the thin film transistor 5 is formed entirely over the insulating substrate 35A.

The lower substrate 72A is comprised of an insulating substrate 35A, an active matrix drive device 5 formed on the insulating substrate 35A, a plurality of pillar-shaped projections 73 standing on the insulating film 18 in line with the active matrix drive device 5, a first insulating film 28 formed on top of the active matrix drive device 5, a second insulating film 30 covering the active matrix drive device 5 and the pillar-shaped projections 73 therewith, and a light-reflective electrode plate 74 formed entirely over the second insulating film.

The active matrix drive device or thin film transistor 5 has a forward stagger structure and is comprised of a source electrode 21 formed on the insulating substrate 35A, a drain electrode 22 formed on the insulating substrate 35A, a semiconductor layer 19 and a doped layer 20 both formed on the insulating substrate 35A between the source and drain electrodes 21 and 22, the insulating layer 18 extending over the insulating substrate 35A and hence covering the source electrode 21, the drain electrode 22, the semiconductor layer 19, and the doped layer 20 therewith, and a gate electrode 17 formed on the insulating film 18.

In the second embodiment, the pillar-shaped projections 73 are comprised of the metal film 17 of which the gate electrode is formed, and the first insulating film 28.

The first insulating film 28 is formed at a surface thereof with first raised and recessed portions 25 originated by the active matrix drive device 5 and the pillar-shaped projections 73. The second insulating film 30 formed over the first insulating film 28 is also formed at a surface thereof with second raised and recessed portions 25A. The first raised and recessed portions 25 are reflected in the second raised and recessed portions 25A with respect to a shape. The second raised and recessed portions 25A reflect and scatter incident lights 15.

The projections 73 can be formed in photolithography and etching steps to be carried out for fabricating the thin film transistor 5. That is, the projections 73 can be formed without addition of particular steps for forming them.

[Third Embodiment]

Figure 5:
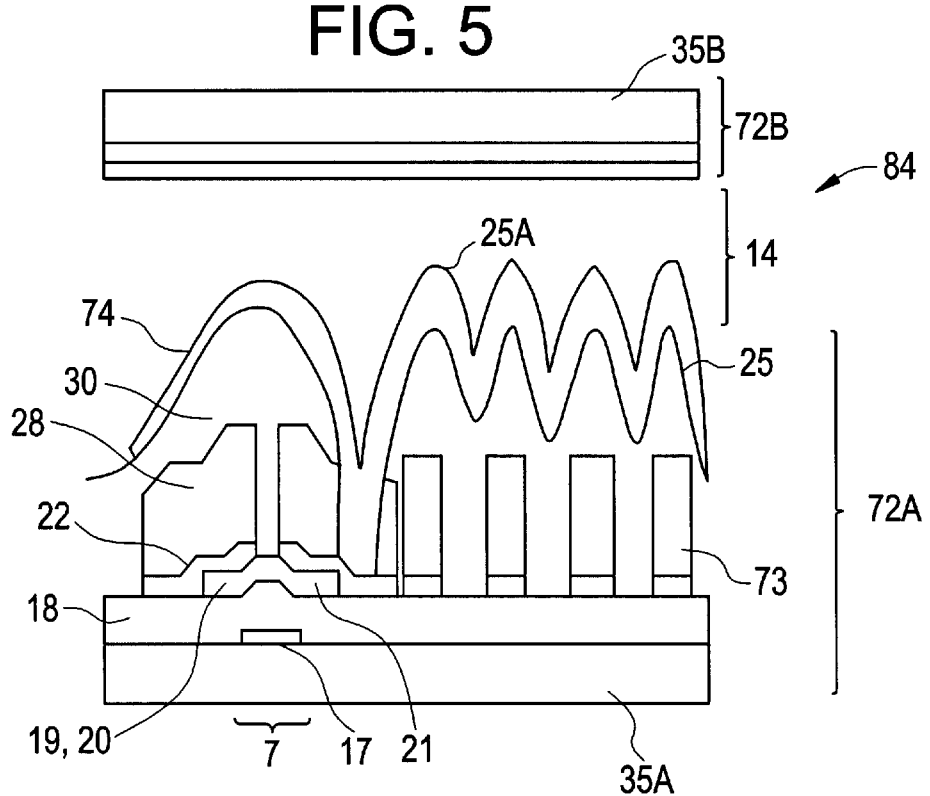
FIG. 5 is a cross-sectional view illustrating a reflection type liquid crystal display in accordance with the third embodiment of the invention.

FIG. 5 is a cross-sectional view illustrating a reflection type liquid crystal display in accordance with the third embodiment of the invention.

A reflection type liquid crystal display 84 in accordance with the third embodiment is designed to include a reverse stagger type thin film transistor 7 as a switching device. Similarly to the first and second embodiments in which the thin film transistor 5 is of forward stagger type, the projections 73 can be formed in photolithography and etching steps to be carried out for fabricating the thin film transistor 7. Hence, though the third embodiment includes a different type of a switching device from the first and second embodiments, it is possible to form the projections 73 without addition of particular steps for forming them.

In the third embodiment, each of the projections 73 is comprised of the layer of which the source electrode 21 and the drain electrode 22 are composed, and the first insulating film 28. However, it should be noted that each of the projections 73 may be comprised of two or more layers among the layers constituting the thin film transistor 7, and the first insulating film 28.

[Fourth Embodiment]

Figure 6:
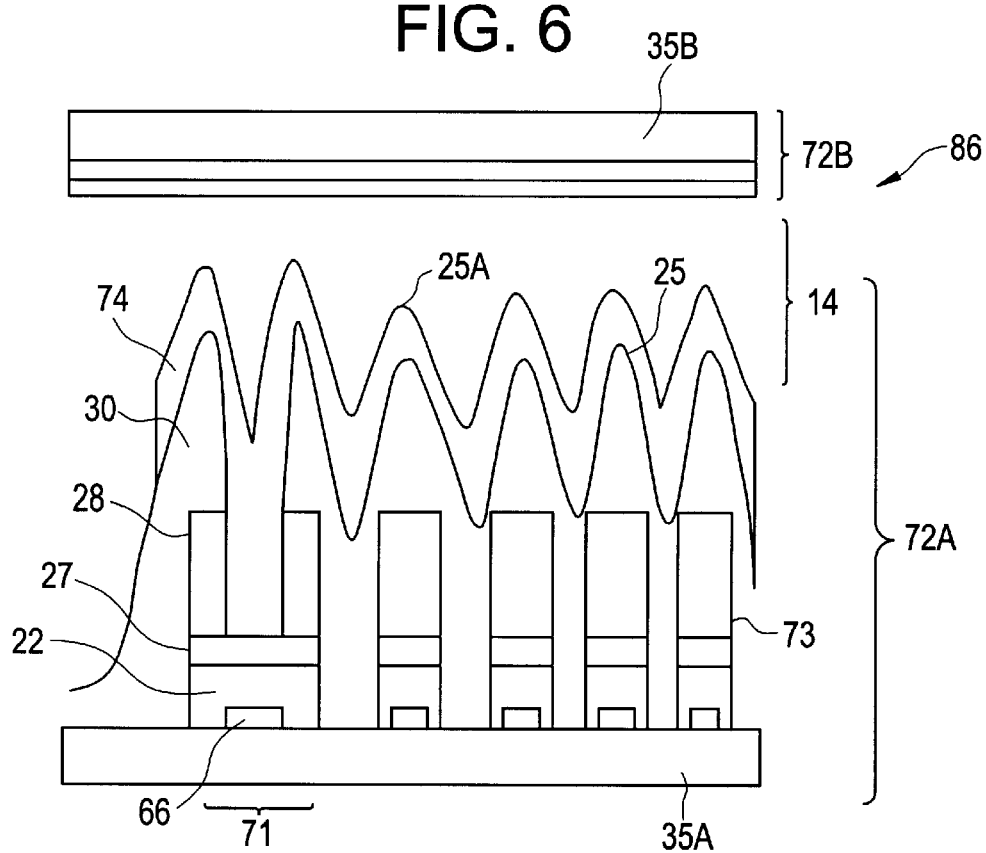
FIG. 6 is a cross-sectional view illustrating a reflection type liquid crystal display in accordance with the fourth embodiment of the invention.

FIG. 6 is a cross-sectional view illustrating a reflection type liquid crystal display in accordance with the fourth embodiment of the invention.

A reflection type liquid crystal display 86 in accordance with the fourth embodiment is designed to include a metal/insulator/metal (MIM) diode 71 as a switching device. Similarly to the first to third embodiments in which a switching device is a thin film transistor, the projections 73 can be formed in photolithography and etching steps to be carried out for fabricating MIM diode 71. Hence, it is possible to form the projections 73 without addition of particular steps for forming them, similarly to the first to third embodiments.

In the fourth embodiment, each of the projections 73 may be comprised of one or more layers among the layers constituting MIM diode 71, and the first insulating film 28.

[Fifth Embodiment]

In the fifth embodiment, modification is made to the above-mentioned first to fourth embodiments.

The projections 73 may be comprised of a layer or layers and the first insulating layer 28 formed on the layer or layers, unless the layer or layers constitute the switching device 5, 7 or 71. There is no limitation in combination in such layers.

Each of the projections 73 is preferably designed to have a height in the range of 0.4 µm to 4 µm both inclusive. For instance, conditions for depositing the layers 17, 18, 19 and 20, and the first insulating film 28 are controlled so that a total height of the layers 17, 18, 19 and 20, and the first insulating film 28 is in the range of 0.4 µm to 4 µm both inclusive.

The second insulating film 30 is preferably designed to have a height in the range of 0.6 µm to 4 µm both inclusive.

The light-reflective plate 74 may be designed to overlap the switching device 5, 7 or 71 through the second insulating film 30 to thereby enhance a numerical aperture.

[Sixth Embodiment]

In the sixth embodiment, modification is made to the above-mentioned first to fourth embodiments.

For instance, the first insulating film 28 may be composed of inorganic material or organic material. The first insulating film 28 may be formed by spin coating, printing, plasma-enhanced chemical vapor deposition (PCVD), thermal chemical vapor deposition, or sputtering. The first insulating film 28 is formed preferably by spin coating or printing, because those methods make it possible to vary a thickness of the first insulating film 28 more readily than a layer or layers constituting the switching device 5, 7 or 71 by controlling viscosity of solvent, spin revolution per minute, and a roller speed.

The first insulating film 28 may be composed preferably of polyimide resin, acrylate resin or SOG. This is because these resins make it easy to vary a thickness of the first insulating film 28 in a wide range, match well with materials used for fabricating the switching device 5, 7 or 71, and have superior characteristics such as electrical insulation, strength, adhesion, film stress, and stability.

In accordance with the sixth embodiment, it is possible to obtain a height of the second raised and recessed portions 25A of the light-reflective electrode plate 74, required for superior reflection characteristic, by controlling a thickness of the first insulating film 28 composed of organic or inorganic material.

[Seventh Embodiment]

Figure 7:
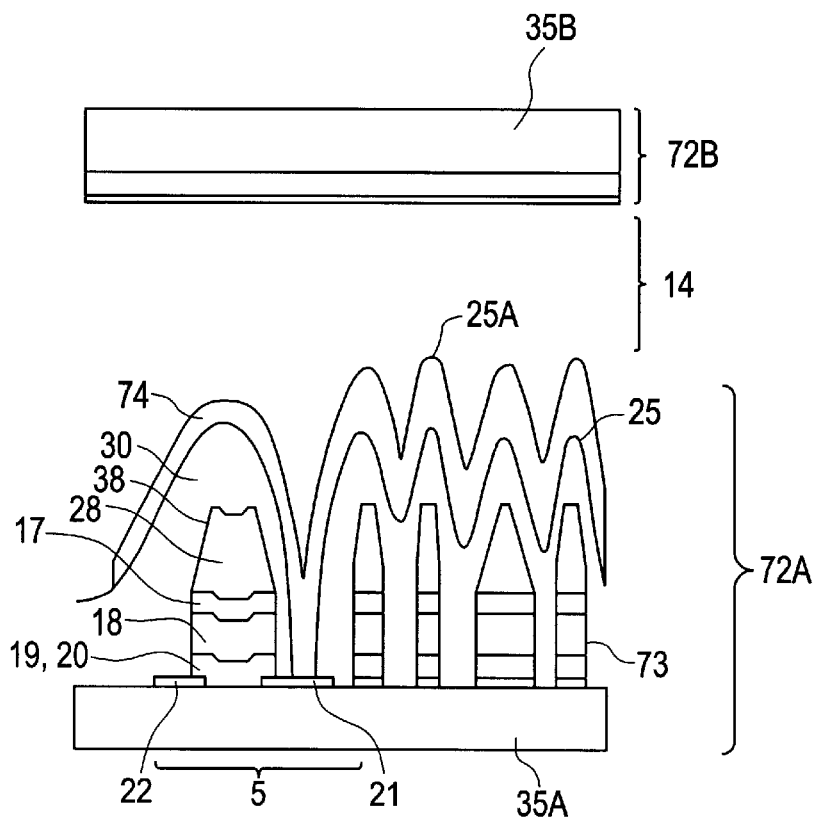
FIG. 7 is a cross-sectional view illustrating a reflection type liquid crystal display in accordance with the seventh embodiment of the invention.

FIG. 7 is a cross-sectional view illustrating a reflection type liquid crystal display in accordance with the seventh embodiment of the invention.

The first insulating film 28 in the reflection type liquid crystal display in accordance with the seventh embodiment is designed to have a tapered sidewall 38. The reflection type liquid crystal display in accordance with the seventh embodiment has the same structure as the structure of the reflection type liquid crystal display in accordance with the first embodiment except the tapered sidewall 38 of the first insulating film 28. The tapered sidewall 38 enables the second raised and recessed portions 25A to have smooth inclination, which ensures enhancement in scattering characteristic of the light-reflective plate 74. Thus, the reflection type liquid crystal display in accordance with the seventh embodiment can provide sufficient brightness on a display screen.

[Eighth Embodiment]

Figure 8:
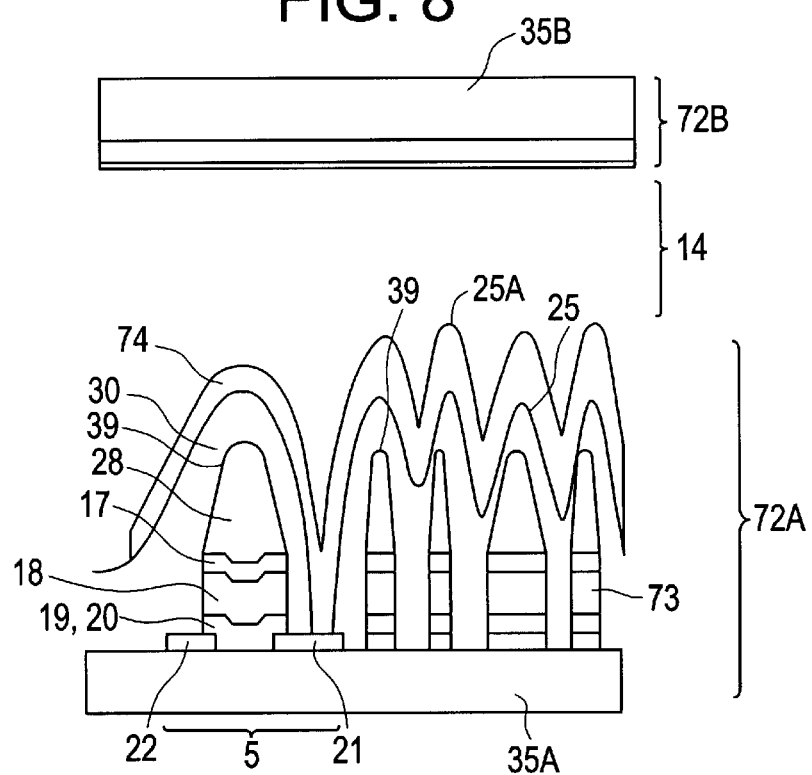
FIG. 8 is a cross-sectional view illustrating a reflection type liquid crystal display in accordance with the eighth embodiment of the invention.

FIG. 8 is a cross-sectional view illustrating a reflection type liquid crystal display in accordance with the eighth embodiment of the invention.

The first insulating film 28 in the reflection type liquid crystal display in accordance with the eighth embodiment is designed to have a rounded summit 39. The reflection type liquid crystal display in accordance with the eighth embodiment has the same structure as the structure of the reflection type liquid crystal display in accordance with the first embodiment except the rounded summit 39 of the first insulating film 28.

The first insulating film 28 is composed of thermally melting or thermally contracting, organic or inorganic material. By appropriately setting conditions for heating the first insulating film 28, a summit of the first insulating film 28 is caused to become rounded.

The rounded summit 39 of the first insulating film 28 makes it possible to readily control an inclination angle of the second raised and recessed portions 25A of the light-reflective plate 74. Thus, it would be possible to enhance reflectance of the light-reflective plate 74 only by controlling conditions for heating or baking the first insulating film 28, without addition of extra fabrication steps.

[Ninth Embodiment]

Figure 9:
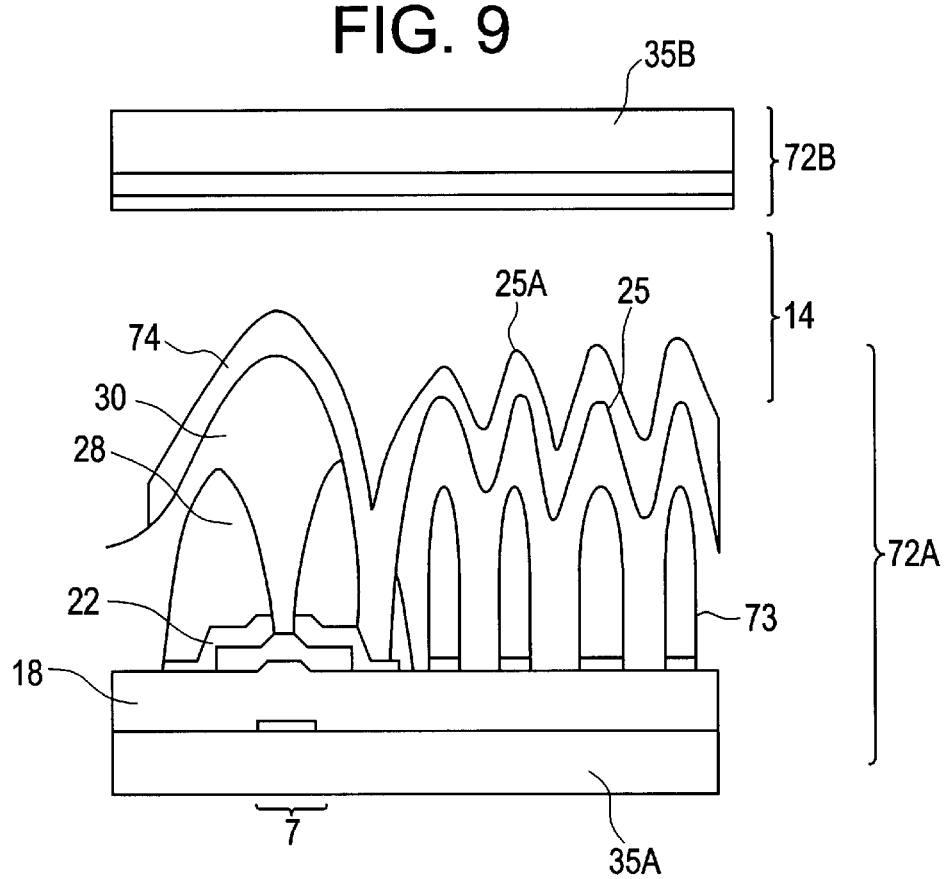
FIG. 9 is a cross-sectional view illustrating a reflection type liquid crystal display in accordance with the ninth embodiment of the invention.

FIG. 9 is a cross-sectional view illustrating a reflection type liquid crystal display in accordance with the ninth embodiment of the invention.

The reflection type liquid crystal display in accordance with the ninth embodiment is designed to include a reverse stagger type thin film transistor 7 as a switching device. Similarly to the reflection type liquid crystal display in accordance with the first embodiment, which is designed to include the forward stagger type thin film transistor 5, the reflection type liquid crystal display in accordance with the ninth embodiment can provide enhanced brightness on a display screen.

[Tenth Embodiment]

Figure 10:
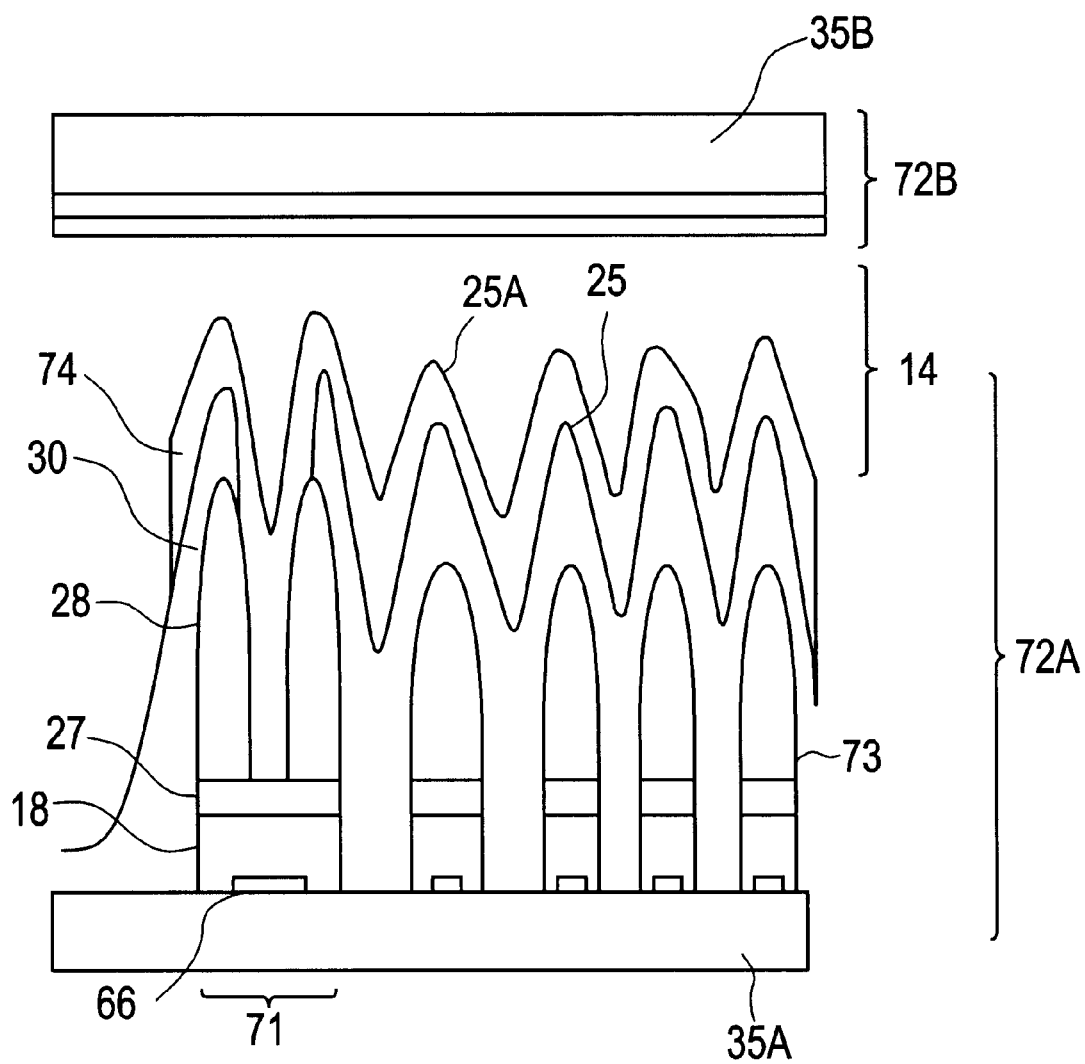
FIG. 10 is a cross-sectional view illustrating a reflection type liquid crystal display in accordance with the tenth embodiment of the invention.

FIG. 10 is a cross-sectional view illustrating a reflection type liquid crystal display in accordance with the tenth embodiment of the invention.

The reflection type liquid crystal display in accordance with the tenth embodiment is designed to include MIM diode 71 as a switching device. Similarly to the first embodiment including the forward stagger type thin film transistor 5, the reflection type liquid crystal display in accordance with the tenth embodiment can provide enhanced brightness on a display screen.

[Eleventh Embodiment]

Figure 11:
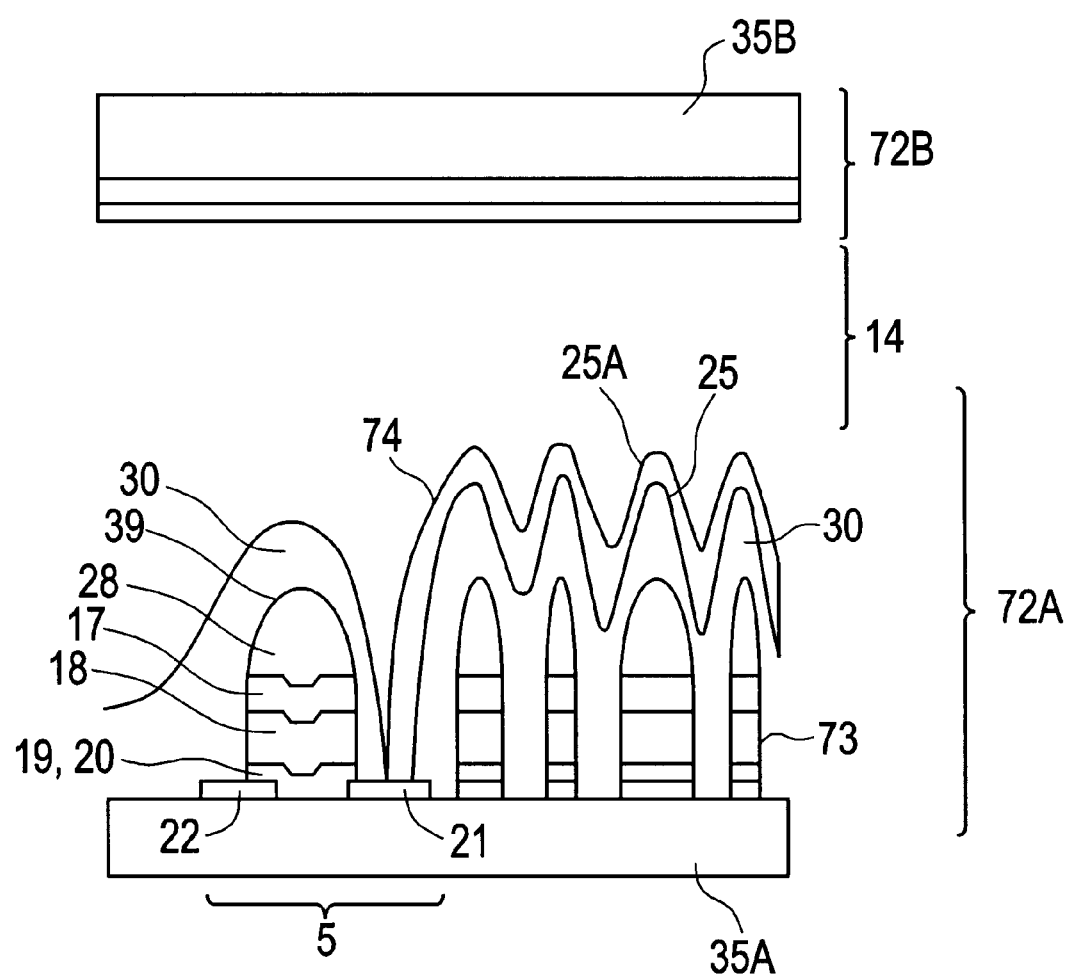
FIG. 11 is a cross-sectional view illustrating a reflection type liquid crystal display in accordance with the eleventh embodiment of the invention.

FIG. 11 is a cross-sectional view illustrating a reflection type liquid crystal display in accordance with the eleventh embodiment of the invention.

In the eleventh embodiment, the light-reflective electrode plate 74 is formed only above a region where the projections 73 are formed. The reflection type liquid crystal display in accordance with the eleventh embodiment has the same structure as the structure of the reflection type liquid crystal display in accordance with the eighth embodiment except the light-reflective electrode plate 74 formed in a limited region.

In the eleventh embodiment, the projections 73 are formed on the insulating substrate 35A concurrently with the fabrication of the thin film transistor 5, and the light-reflective electrode plate 74 is formed above the projections 73 with the second insulating film 30 being sandwiched therebetween. Since the light-reflective electrode plate 74 can be formed of a layer separate from layers of which the thin film transistor 5, the source electrode 21, and the drain electrode 22 are formed, the light-reflective electrode plate 74 could have an increased area, which would ensure an increase in light reflection.

The first raised and recessed portions 25 are formed at a surface of the second insulating film 30. Hence, even if each of the projections 73 had a flat summit, as illustrated in FIG. 7, the second insulating film 30 covering the projections 73 therewith would have no flat portions.

An inclination angle of the second raised and recessed portions 25A can be varied in a wide range by varying a dimension of the projections 73 and/or a thickness of the second insulating film 30. Thus, it is possible to form the second raised and recessed portions 25A having superior reflection characteristic.

Figure 12A:
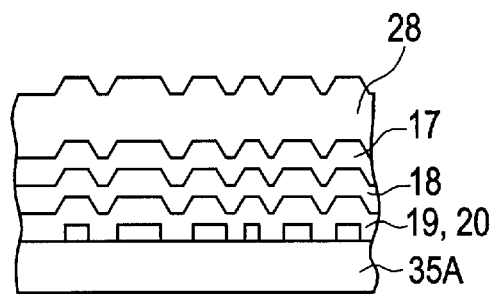
FIGS. 12A to 12C are cross-sectional views of the reflection type liquid crystal display in accordance with the eleventh embodiment, illustrating respective steps of a method of fabricating the same.
Figure 12B:
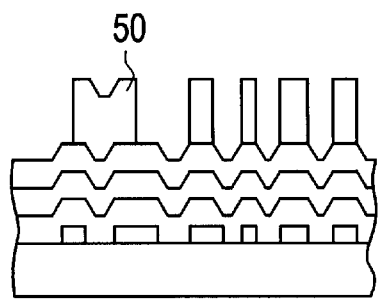
Figure 12C:
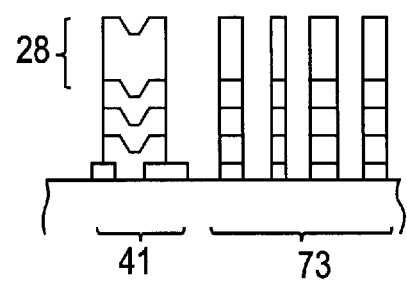

The first insulating film 28 may be composed of insulating photosensitive material. FIGS. 12A to 12C are cross-sectional views of the reflection type liquid crystal display including the first insulating film 28 composed of insulating photosensitive material, illustrating respective steps of a method of fabricating the same.

As illustrated in FIG. 12A, the first insulating film 28 is formed over the layers 17, 18, 19 and 20. Then, as illustrated in FIG. 12B, the first insulating film 28 is patterned by photolithography and etching. Then, as illustrated in FIG. 12C, the layers 17, 18, 19 and 20 are etched by using the patterned first insulating film 28 as a mask 50, to thereby fabricate a switching device 41 along with the projections 73.

The patterned first insulating film 28 having been used as the mask 50 constitutes a part of the projections 73. Hence, the reflection type liquid crystal display can be fabricated in the less number of fabrication steps.

The first insulating film 28 may be composed of non-photosensitive material. FIGS. 13A to 13D are cross-sectional views of the reflection type liquid crystal display including the first insulating film 28 composed of non-photosensitive material, illustrating respective steps of a method of fabricating the same.

Figure 13A:
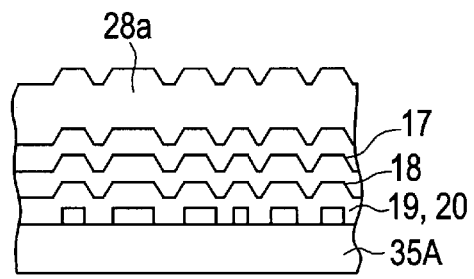
FIGS. 13A to 13D are cross-sectional views of the reflection type liquid crystal display in accordance with the eleventh embodiment, illustrating respective steps of a method of fabricating the same.
Figure 13B:
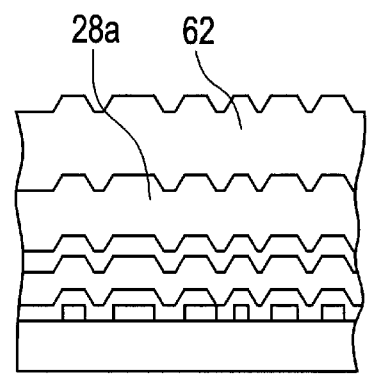
Figure 13C:
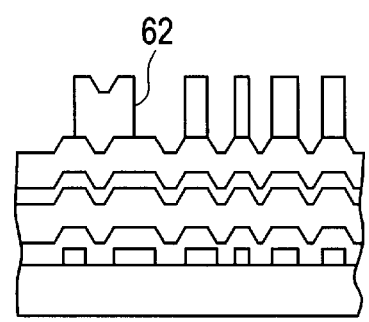
Figure 13D:
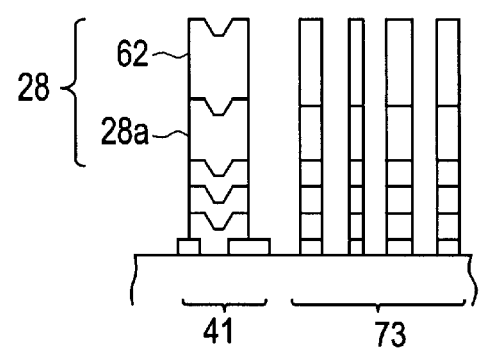

As illustrated in FIG. 13A, an insulating film 28a is formed over the layers 17, 18, 19 and 20. Then, as illustrated in FIG. 13B, a layer 62 composed of photosensitive material is formed over the insulating film 28a. Then, as illustrated in FIG. 13C, the layer 62 is patterned by photolithography and etching. Then, as illustrated in FIG. 13D, the layers 17, 18, 19 and 20 and the insulating film 28a are etched by using the patterned insulating film 28a as a mask, to thereby fabricate a switching device 41 together with the projections 73. In this example, a combination of the layer 62 and the insulating film 28 acts as the first insulating film 28 shown in the previously mentioned embodiments.

The patterned layer 62 having been used as a mask constitutes a part of the projections 73. Hence, the reflection type liquid crystal display can be fabricated in the less number of fabrication steps.

FIGS. 14A to 14E are cross-sectional views of a reflection type liquid crystal display in accordance with a conventional method, illustrating respective steps of a method of fabricating the same. The illustrated method is a method using a photoresist film.

Figure 14A:
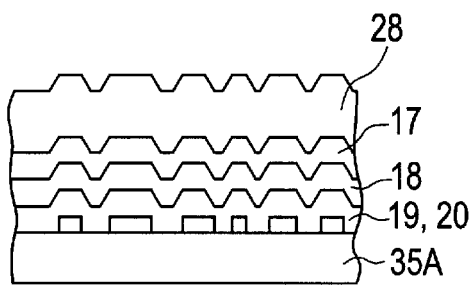
FIGS. 14A to 14E are cross-sectional views of a reflection type liquid crystal display in accordance with a conventional method, illustrating respective steps of a method of fabricating the same.
Figure 14B:
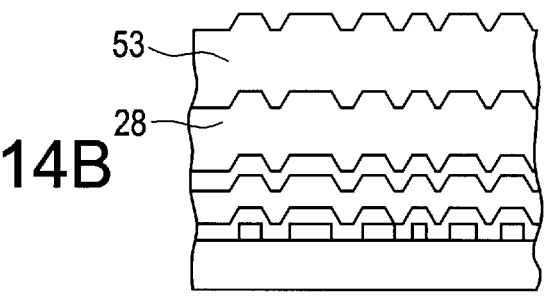
Figure 14C:
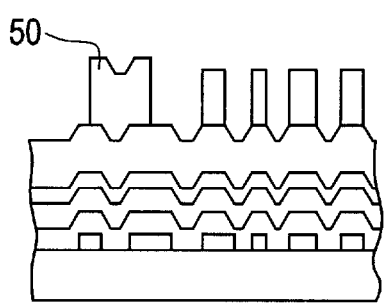
Figure 14D:
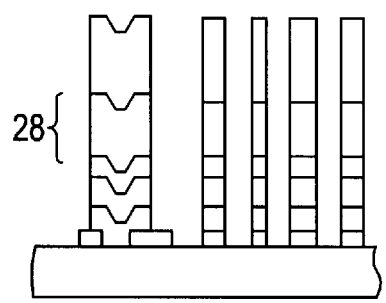
Figure 14E:
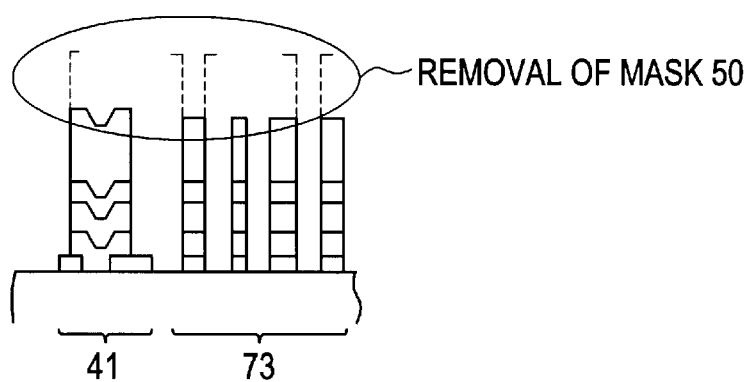

As illustrated in FIG. 14A, the first insulating film 28 is formed over the layers 17, 18, 19 and 20. Then, as illustrated in FIG. 14B, a photoresist film 53 is formed over the first insulating film 28. Then, as illustrated in FIG. 14C, the photoresist film is patterned by photolithography and etching. Then, as illustrated in FIG. 14D, the layers 17, 18, 19 and 20 and the first insulating film 28 are etched by using the patterned photoresist film 53 as a mask 50, to thereby fabricate a switching device 41 together with the projections 73. Then, as illustrated in FIG. 14E, the mask 50 is removed.

Thus, the conventional method illustrated in FIGS. 14A to 14E additionally includes the steps of applying the photoresist film 53, developing the photoresist film 53, etching the layers 17, 18, 19 and 20 and the first insulating film 28, and removing the photoresist film 53, relative to the method illustrated in FIGS. 12A to 12C or FIGS. 13A to 13D. Namely, the conventional method cannot avoid having the greater number of fabrication steps than the number of fabrication steps of the methods illustrated in FIGS. 12A to 12C or FIGS. 13A to 13D.

The second insulating film 30 may be composed of inorganic or organic material, similarly to the first insulating film 28. It is preferable that the second insulating film 30 is an insulating film which can be formed by spin coating or printing. The second insulating film 30 is composed preferably of polyimide resin, acrylate resin, or SOG.

The second insulating film 30 may be composed of insulating photosensitive material, similarly to the first insulating material 28.

Before explaining the advantage of the second insulating film 30 composed of photosensitive material, hereinbelow is explained a method of fabricating a reflection type liquid crystal display including the second insulating film 30 composed of insulating non-photosensitive material, with reference to FIGS. 16A to 16E.

Figure 16A:
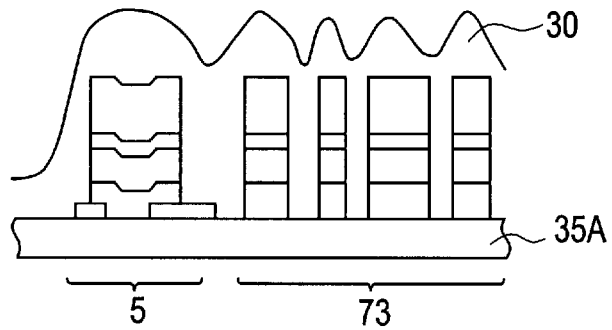
FIGS. 16A and 16E are cross-sectional views of a reflection type liquid crystal display including an insulating film composed of non-photosensitive material, illustrating respective steps of a method of fabricating the same.
Figure 16B:
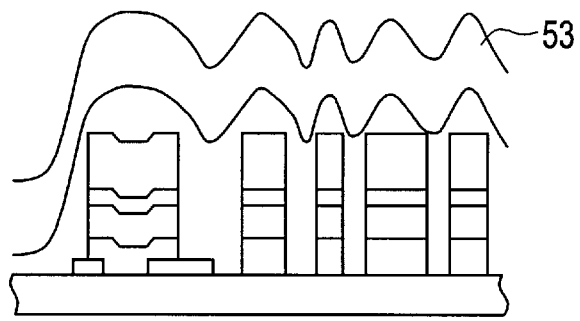
Figure 16C:
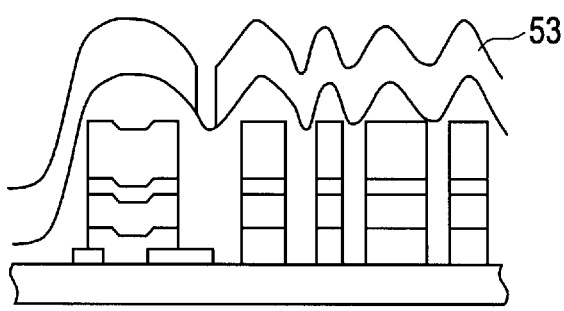
Figure 16D:
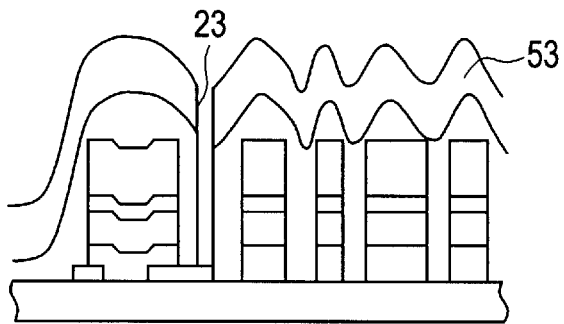
Figure 16E:
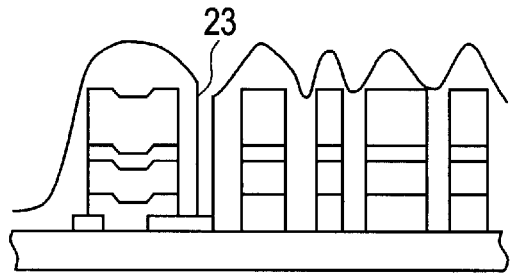

As illustrated in FIG. 16A, after the formation of the thin film transistor 5 and the projections 73 on the insulating substrate 35A, the second insulating film 30 composed of non-photosensitive material is formed over the insulating substrate 35A, covering the thin film transistor 5 and the projections 73 therewith. Then, as illustrated in FIG. 16B, a photoresist film 53 is formed entirely over the second insulating film 30. Then, as illustrated in FIG. 16C, the photoresist film 53 is patterned by photolithography and dry etching steps. Then, as illustrated in FIG. 16D, a contact hole 23 reaching the insulating substrate 35A is formed throughout the second insulating film 30 through the use of the patterned photoresist film 53 as a mask. Then, as illustrated in FIG. 16E, the photoresist film 53 is removed.

Figure 15A:
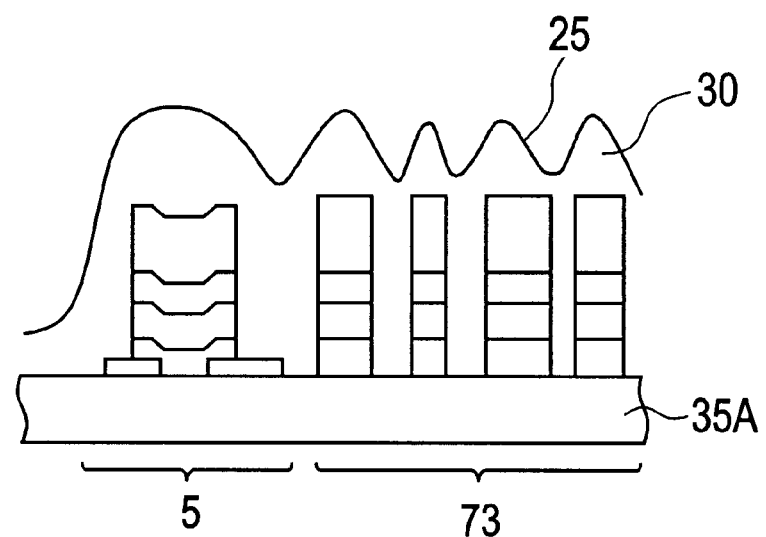
FIGS. 15A and 15B are cross-sectional views of a reflection type liquid crystal display including an insulating film composed of photosensitive material, illustrating respective steps of a method of fabricating the same.
Figure 15B:
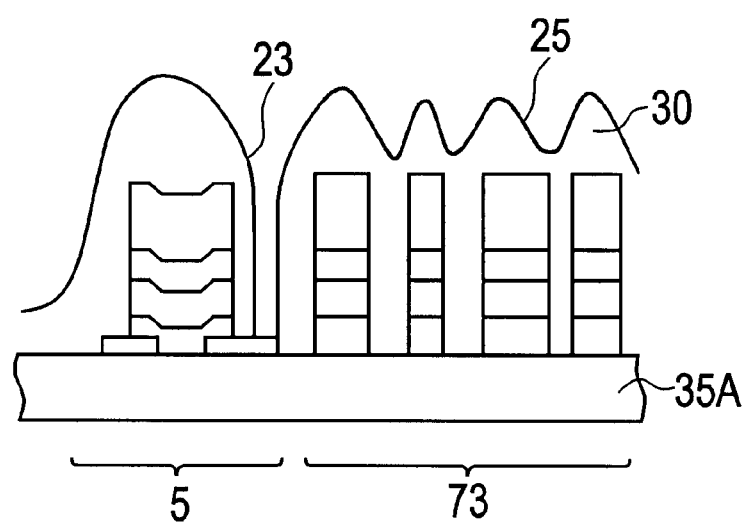

FIGS. 15A and 15B are cross-sectional views of a reflection type liquid crystal display including the second insulating film 30 composed of insulating photosensitive material.

As illustrated in FIG. 15A, after the formation of the thin film transistor 5 and the projections 73 on the insulating substrate 35A, the second insulating film 30 composed of photosensitive material is formed over the insulating substrate 35A, covering the thin film transistor 5 and the projections 73 therewith. Then, as illustrated in FIG. 15B, a contact hole 23 reaching the insulating substrate 35A is formed throughout the second insulating film 30.

By composing the second insulating film 30 of photosensitive material, it is no longer necessary to carry out photolithography and etching steps for forming the contact hole 23 electrically connecting the switching device 5 to the light-reflective electrode plate 74. In addition, it is now possible to pattern the second insulating film 30 by wet etching without carrying out a dry etching step unlike the conventional method as illustrated in FIGS. 16A to 16E in which it was absolutely necessary to carry out a dry etching step, ensuring simplification in fabrication steps and reduction in fabrication cost.

The insulating substrates 35A and 35B may be composed of glass, organic material such as plastic and acryl, quartz, ceramics, and inorganic material such as silicon. As an alternative, semiconductor substrates may be used as the substrates 35A and 35B.

[Twelfth Embodiment]

Figure 17:
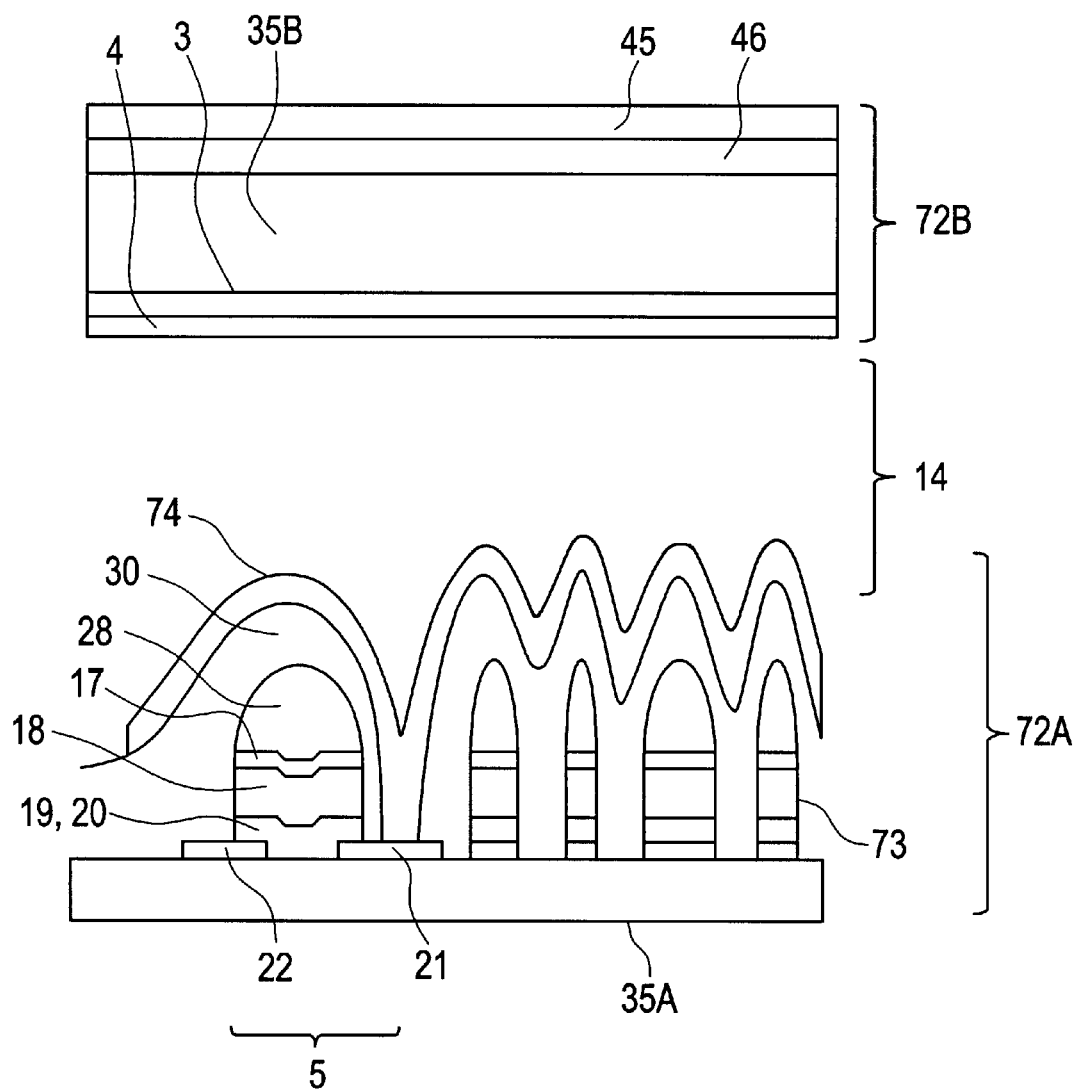
FIG. 17 is a cross-sectional view illustrating a reflection type liquid crystal display in accordance with the twelfth embodiment of the invention.

FIG. 17 is a cross-sectional view illustrating a reflection type liquid crystal display in accordance with the twelfth embodiment of the invention.

In the twelfth embodiment, the upper substrate 72B is designed to further include a polarizing plate 45 formed on a surface of the insulating substrate 35B at the opposite side of the color filter 3 and the transparent electrode 4, and a quarter wavelength plate 46 formed on the polarizing plate 45.

In the twelfth embodiment, a liquid crystal layer is not to be limited to the GH liquid crystal layer 14. A liquid crystal cell includes the switching device 41 and the light-reflective electrode plate 74 therein. For instance, the reflection type liquid crystal display in accordance with the twelfth embodiment is of single polarizing plate type.

[Thirteenth Embodiment]

FIGS. 18A to 18F are cross-sectional views of a reflection type liquid crystal display in accordance with the thirteenth embodiment, illustrating respective steps of a method of fabricating the same.

The reflection type liquid crystal display in accordance with the thirteenth embodiment is fabricated concurrently with the fabrication of a thin film transistor having a forward stagger structure. photosensitive material and formed over the layers 17, 18, 19 and 20 is exposed to a light and developed for forming a pattern of the thin film transistor 5 and the projections 73. The layers 17, 18, 19 and 20 are etched through the use of the thus patterned first insulating film 28 to thereby form the thin film transistor 5 and the projections 73. That is, the thin film transistor 5 and the projections 73 are formed at the same time. In addition, the patterned first insulating film 28 having been used as a mask partially constitutes the projections 73.

In accordance with the thirteenth embodiment, it is no longer necessary to form the first raised and recessed portions 25 separately from the thin film transistor 5. In addition, the patterned first insulating film 28 having been used as a mask partially constitutes the projections 73. Hence, it is possible to omit a step of removing a photoresist film, which was absolutely necessary to be carried out in a conventional method including photolithography and etching steps for forming the projections 73, ensuring simplification of the process of fabricating a reflection type liquid crystal display.

Thus, the method of fabricating the reflection type liquid crystal display in accordance with the thirteenth embodiment carries out totally four photolithography and etching steps, whereas the conventional method as illustrated in FIGS. 2A to 2H has to carry out totally seven photolithography and etching steps in order to fabricate the lower substrate 72A. The thirteenth embodiment makes it possible to fabricate a reflection type liquid crystal display in the less number of photolithography and etching steps than the number of the same in the conventional method.

The first and second insulating films 28 and 30 may be composed of inorganic photosensitive material in place of organic photosensitive material. The same advantages as mentioned above can be obtained.

If the first and second insulating films 28 and 30 are composed of organic or inorganic non-photosensitive material, and are patterned in photolithography and etching steps, additional steps of applying a photoresist film The reflection type liquid crystal display in accordance with the present invention may include a forward stagger type thin film transistor, a reverse stagger type thin film transistor or MIM diode as an active matrix drive device. Among those active matrix drive devices, a forward stagger thin film transistor is preferably selected in order to maintain high performance of a switching device and reduce the number of fabrication steps.

Figure 18A:
FIGS. 18A to 18F are cross-sectional views of a reflection type liquid crystal display in accordance with the thirteenth embodiment, illustrating respective steps of a method of fabricating the same.

First, as illustrated in FIG. 18A, a metal film is deposited on the insulating substrate 35A, and patterned into the source and drain electrodes 21 and 22 by first photolithography and etching steps.

Figure 18B:
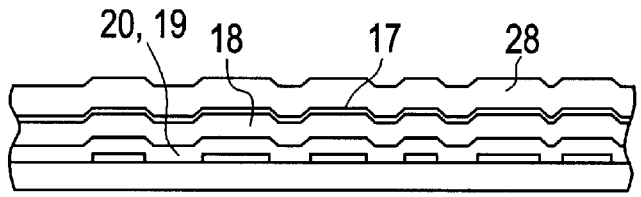

Then, as illustrated in FIG. 18B, the doped layer 20, the semiconductor layer 19, the insulating film 18, the gate insulating film 17, and the first insulating film 28 are deposited on the insulating substrate 35A. Herein, the first insulating film 28 is composed of organic photosensitive material.

Figure 18C:
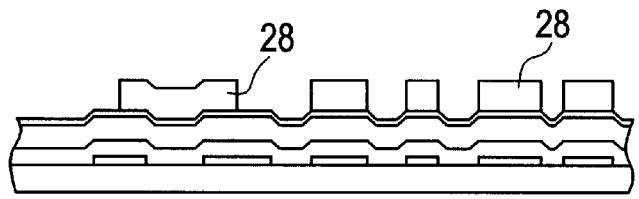

Then, as illustrated in FIG. 18C, the first insulating film 28 is patterned into islands of the thin film transistor 5 and the projections 73 by second photolithography and etching steps.

Figure 18D:
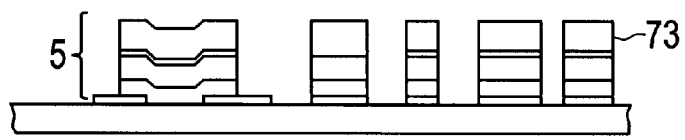

Then, as illustrated in FIG. 18D, the layers 17, 18, 19 and 20 are etched with the patterned first insulating film 28 being used as a mask, to thereby form the thin film transistor 5 and the projections 73.

Figure 18E:
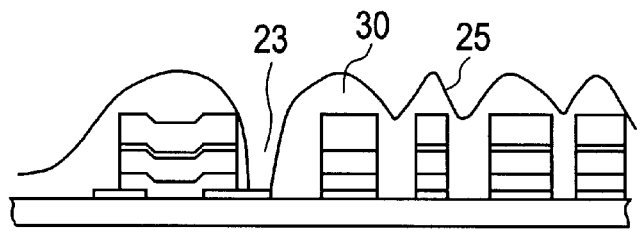
Figure 18F:
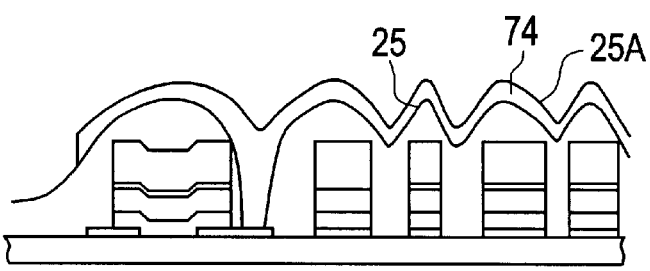

Then, as illustrated in FIG. 18E, the second insulating film 30 is deposited entirely over the product resulted from the step illustrated in FIG. 18D, and thereafter, is patterned by third photolithography and etching steps to thereby form a contact hole 23 reaching the source electrode 21. The thus formed second insulating film 30 is formed with the first raised and recessed portions 25.

Then, a metal layer is deposited entirely over the product resulted from the step illustrated in FIG. 18E. The metal layer is patterned by fourth photolithography and etching steps to thereby form the light-reflective electrode plate 74 over the second insulating film 30.

In the above-mentioned method, the first insulating film 28 composed of and removing the photoresist film have to be carried out. Even so, it is possible to reduce the number of fabrication steps relative to a conventional method of fabricating a reflection type liquid crystal display.

In the above-mentioned thirteenth embodiment, the projections 73 are comprised of the layers 17 to 20 and the first insulating film 28. However, it should be noted that the projections 73 may be formed of other combination of films. For instance, each of the projections 73 may be formed of at least one of the layers 17 to 20, and the first insulating film 28. As an alternative, each of the projections 73 may be formed of at least one of the layers 17 to 20.

The first raised and recessed portions 25 may be formed in any one of steps of patterning a layer, to be carried out in the fabrication of the thin film transistor 5. For instance, the first insulating film 28 may be deposited on a metal film from which the source and drain electrodes 21 and 22 are to be formed, and be patterned concurrently with patterning the metal film into the source and drain electrodes 21 and 22.

[Fourteenth Embodiment]

FIGS. 19A to 19G are cross-sectional views of a reflection type liquid crystal display in accordance with the fourteenth embodiment, illustrating respective steps of a method of fabricating the same.

The reflection type liquid crystal display in accordance with the fourteenth embodiment is fabricated concurrently with the fabrication of a thin film transistor having a reverse stagger structure.

Figure 19A:
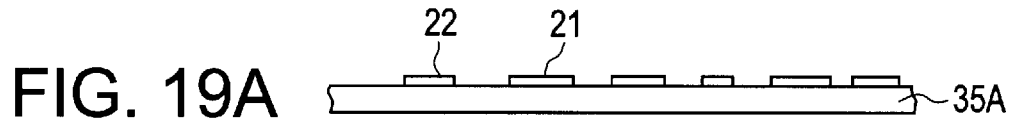
FIGS. 19A to 19G are cross-sectional views of a reflection type liquid crystal display in accordance with the fourteenth embodiment, illustrating respective steps of a method of fabricating the same.

First, as illustrated in FIG. 19A, a metal film is deposited on the insulating substrate 35A, and patterned into the source and drain electrodes 21 and 22 by first photolithography and etching steps.

Figure 19B:
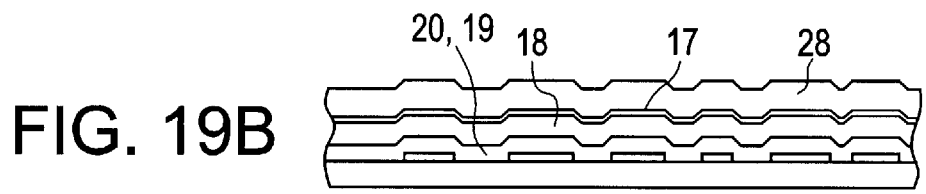

Then, as illustrated in FIG. 19B, the doped layer 20, the semiconductor layer 19, the insulating film 18, the gate insulating film 17, and the first insulating film 28 are deposited on the insulating substrate 35A. Herein, the first insulating film 28 is composed of organic or inorganic photosensitive material.

Figure 19C:
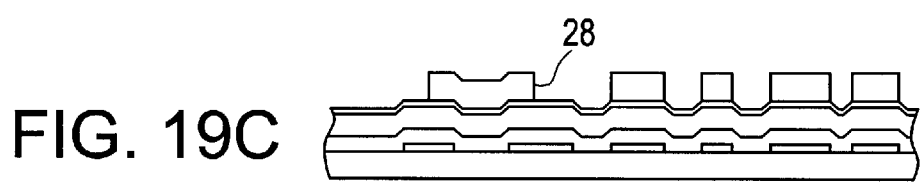

Then, as illustrated in FIG. 19C, the first insulating film 28 is patterned into islands of the thin film transistor 5 and the projections 73 by second photolithography and etching steps.

Figure 19D:
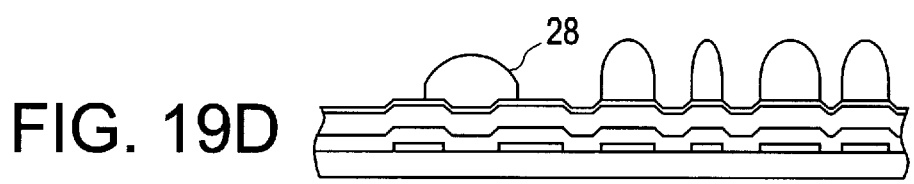

Then, as illustrated in FIG. 19D, the islands of the patterned first insulating film 28 are rounded at a summit thereof As an alternative, the islands of the thin film transistor 5 and the projections 73 may be tapered at a sidewall thereof.

Figure 19E:
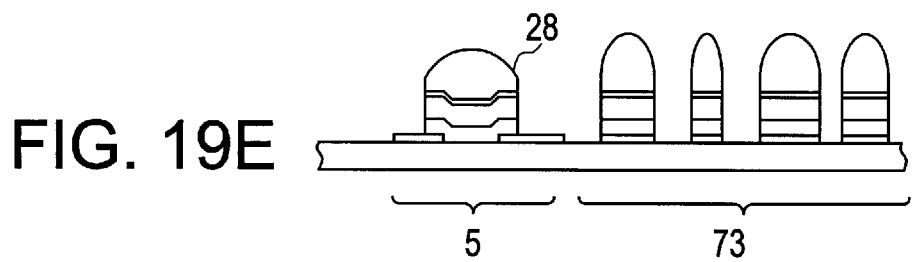

Then, as illustrated in FIG. 19E, the layers 17, 18, 19 and 20 are etched with the patterned first insulating film 28 being used as a mask, to thereby form the thin film transistor 5 and the projections 73.

Figure 19F:
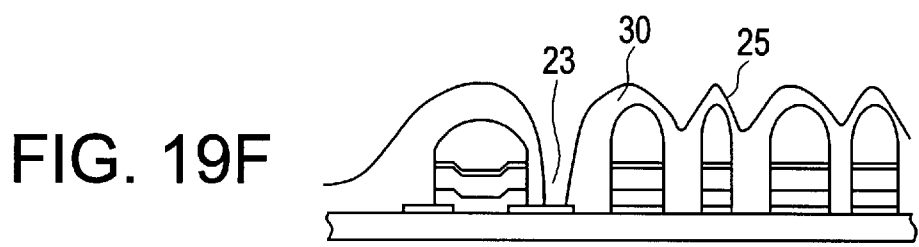
Figure 19G:
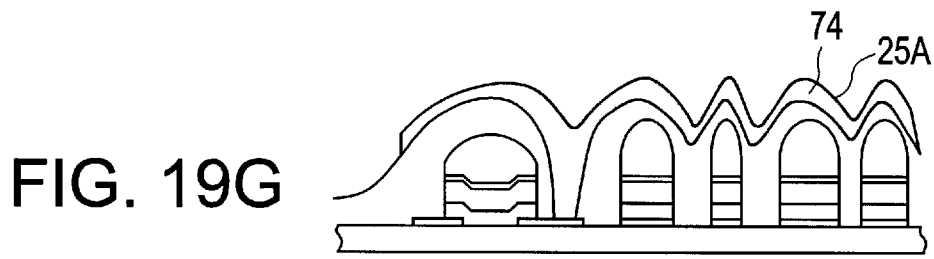

Then, as illustrated in FIG. 19F, the second insulating film 30 is deposited entirely over the product resulted from the step illustrated in FIG. 19E, and thereafter, is patterned by third photolithography and etching steps to thereby form a contact hole 23 reaching the source electrode 21. The thus formed second insulating film 30 is formed with the first raised and recessed portions 25.

Then, a metal layer is deposited entirely over the product resulted from the step illustrated in FIG. 19F. The metal layer is patterned by fourth photolithography and etching steps to thereby form the light-reflective electrode plate 74 over the second insulating film 30.

Thus, the method of fabricating the reflection type liquid crystal display in accordance with the fourteenth embodiment carries out totally four photolithography and etching steps, whereas the conventional method as illustrated in FIGS. 2A to 2H has to carry out totally seven photolithography and etching steps in order to fabricate the lower substrate 72A. The fourteenth embodiment makes it possible to fabricate a reflection type liquid crystal display in the less number of photolithography and etching steps than the number of the same in the conventional method.

In accordance with the fourteenth embodiment, the projections 73 are patterned in any one of steps of patterning a layer or layers constituting the thin film transistor 5. In addition, the patterned first insulating film 28 having been used as a mask partially constitutes the projections 73. Thus, though the fourteenth embodiment includes the switching device 5 which is of different type of the switching device of the thirteenth embodiment, the fourteenth embodiment provides the same advantages as those obtained by the thirteenth embodiment.

[Fifteenth Embodiment]

FIGS. 20A to 20F are cross-sectional views of a reflection type liquid crystal display in accordance with the fifteenth embodiment, illustrating respective steps of a method of fabricating the same.

The reflection type liquid crystal display in accordance with the fifteenth embodiment is fabricated concurrently with the fabrication of MIM diode 71.

Figure 20A:
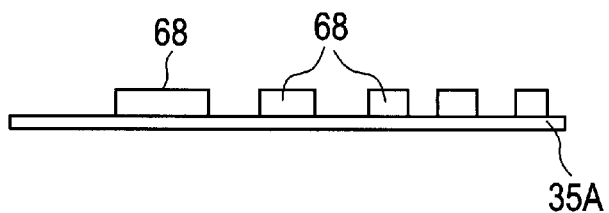
FIGS. 20A to 20F are cross-sectional views of a reflection type liquid crystal display in accordance with the fifteenth embodiment, illustrating respective steps of a method of fabricating the same.

First, as illustrated in FIG. 20A, a tantalum film is deposited on the insulating substrate 35A, and patterned into a plurality of lead electrodes 68 by first photolithography and wet etching steps.

Figure 20B:
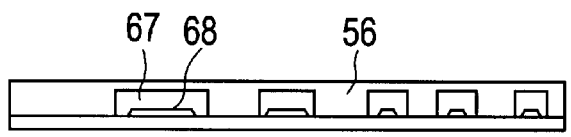

Then, as illustrated in FIG. 20B, tantalum oxide films 67 are formed around each of the lead electrodes 68 by anode oxidation. Then, a silicon dioxide film 56 is deposited entirely over the insulating substrate 35A and the tantalum oxide films 67. Then, a polyimide film 11 of which the first insulating film 28 is composed is deposited entirely over the silicon dioxide film 56.

Figure 20C:
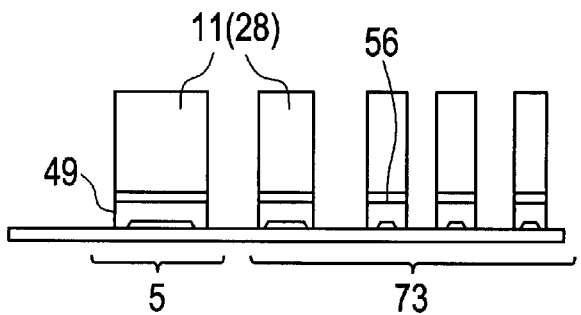

Then, as illustrated in FIG. 20C, the polyimide film 11 and the silicon dioxide film 56 are patterned by second photolithography and dry etching steps to thereby form islands of MIM diode 71 and the projections 73.

Figure 20D:
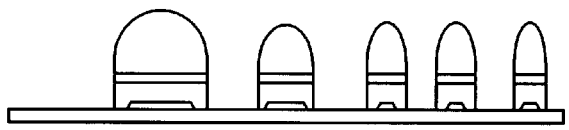

Then, as illustrated in FIG. 20D, each of the islands are rounded at summits thereof by melting the islands. As an alternative, the islands of the thin film transistor 5 and the projections 73 may be tapered at a sidewall thereof.

Figure 20E:
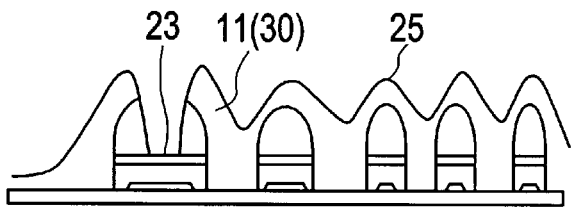
Figure 20F:
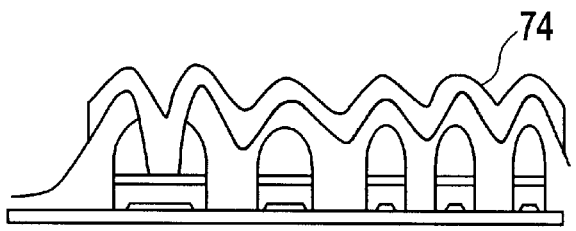

Then, as illustrated in FIG. 20E, a polyimide film 11 of which the second insulating film 30 is composed is deposited entirely over the product resulted from the step illustrated in FIG. 20D.

Then, as illustrated in FIG. 20E, the polyimide film 11 is patterned by third photolithography and etching steps to thereby form a contact hole 23 reaching the silicon dioxide film 56. The thus formed second insulating film 30 is formed with the first raised and recessed portions 25.

Then, an aluminum layer is deposited entirely over the product resulted from the step illustrated in FIG. 20E. The aluminum layer is patterned by fourth photolithography and wet etching steps to thereby form the light-reflective electrode plate 74 over the second insulating film 30.

Thus, the method of fabricating the reflection type liquid crystal display in accordance with the fifteenth embodiment carries out totally four photolithography and etching steps, whereas the conventional method as illustrated in FIGS. 2A to 2H has to carry out totally seven photolithography and etching steps in order to fabricate the lower substrate 72A. The fifteenth embodiment makes it possible to fabricate a reflection type liquid crystal display in the less number of photolithography and etching steps than the number of the same in the conventional method.

In addition, since MIM diode 71 and the projections 73 can be controlled with respect to a height and a shape, the resultant reflection type liquid crystal display provide enhanced brightness and contrast.

Hereinbelow are described examples to which the reflection type liquid crystal displays in accordance with the above-mentioned embodiments are applied.

EXAMPLE 1

FIGS. 21A to 21F are cross-sectional views of a reflection type liquid crystal display in accordance with example 1, illustrating respective steps of a method of fabricating the same.

The reflection type liquid crystal display in accordance with example 1 is fabricated concurrently with the fabrication of a thin film transistor having a forward stagger structure.

Figure 21A:
FIGS. 21A to 21F are cross-sectional views of a reflection type liquid crystal display in accordance with example 1, illustrating respective steps of a method of fabricating the same.

First, as illustrated in FIG. 21A, a chromium film is deposited on the insulating substrate 35A by a thickness of 50 nm by sputtering. Then, the chromium film is patterned into the source and drain electrodes 21 and 22 by first photolithography and etching steps.

Figure 21B:
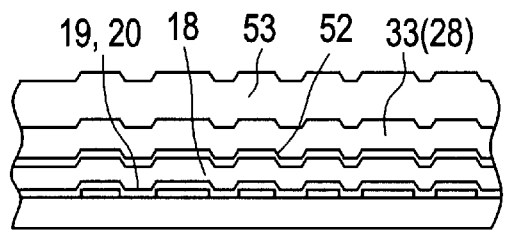

Then, as illustrated in FIG. 21B, a 100 nm-thick doped layer 20, a 100 nm-thick semiconductor layer 19, and a 400 nm-thick gate insulating film 18 are deposited on the insulating substrate 35A by plasma-enhanced chemical vapor deposition.

Herein, the gate insulating film 18 is composed of a silicon dioxide film and a silicon nitride film. The semiconductor layer 19 is composed of amorphous silicon, and the doped layer 20 is composed of n-type amorphous silicon.

The conditions for forming the silicon dioxide film by plasma-enhanced chemical vapor deposition are as follows.

Process gases: silane gas and oxide gas
Gas flow ratio (silane gas flow rate/oxide gas flow rate): 0.1–0.5
Film deposition temperature: 200–300 degrees centigrade
Pressure: 1 Torr
Plasma power: 200 W The conditions for forming the silicon nitride film by plasma-enhanced chemical vapor deposition are as follows.

Process gases: silane gas and ammonia gas
Gas flow ratio (silane gas flow rate/ammonia gas flow rate): 0.1–0.8
Film deposition temperature: 250 degrees centigrade
Pressure: 1 Torr
Plasma power: 200 W The conditions for forming the amorphous silicon film by plasma-enhanced chemical vapor deposition are as follows.

Process gases: silane gas and hydrogen gas
Gas flow ratio (silane gas flow rate/hydrogen gas flow rate): 0.25–2

Film deposition temperature: 200–250 degrees centigrade

Pressure: 1 Torr

Plasma power: 50 W

The conditions for forming the n-type amorphous silicon film by plasma-enhanced chemical vapor deposition are as follows.

Process gases: silane gas and phosphine gas

Gas flow ratio (silane gas flow rate/phosphine gas flow rate): 1–2

Film deposition temperature: 200–250 degrees centigrade

Pressure: 1 Torr

Plasma power: 50 W

Then, a chromium film 52 is deposited by a thickness of 50 nm by sputtering entirely over the gate insulating film 18.

Then, an organic insulating film 33 from which the first insulating film 28 is formed is deposited by a thickness of 2 $\mu$m by spin coating entirely over the chromium film 52. The organic insulating film 33 is comprised of a polyimide film commercially available from Nissan Kagaku Co. in the tradename of "RN-812", and a resist film deposited on the polyimide film. The resist film is used for patterning the polyimide film.

The conditions for forming the polyimide film are as follows.

Spin revolution per minute: 1200 r.p.m.

Pre-baking temperature: 90 degrees centigrade

Pre-baking time: 10 minutes

Main baking temperature: 250 degrees centigrade

Main baking time: 1 hour

The conditions for forming the resist film are as follows.

Spin revolution per minute: 1000 r.p.m.

Pre-baking temperature: 90 degrees centigrade

Pre-baking time: 5 minutes

After pre-baking, the resist film is patterned by exposure to a light and development, and then, is post-baked at 90 degrees centigrade for 30 minutes. Then, the organic insulating film 33 is formed with the first raised and recessed portions 25 by dry etching, using the patterned resist film as a mask.

The conditions for dry etching the polyimide film are as follows.

Etching gases: fluorine tetrachloride gas and oxygen gas

Gas flow ratio (fluorine tetrachloride gas flow rate/oxygen gas flow rate): 0.5–1.5

Gas pressure: 5–300 mTorr

Plasma power: 100–300 W

Then, a photoresist film 53 is deposited entirely over the thus formed first insulating film 28.

Figure 21C:
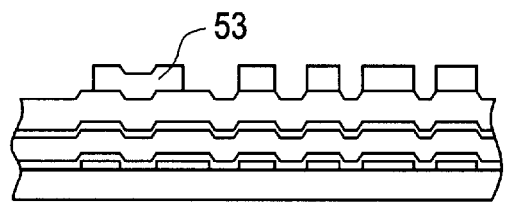

Then, as illustrated in FIG. 21C, the photoresist film 53 is patterned into a pattern for forming the thin film transistor 5 and the projections 73, by second photolithography and etching steps.

Figure 21D:
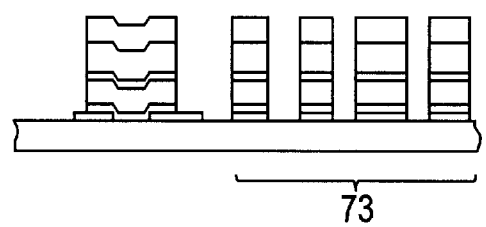

Then, as illustrated in FIG. 21D, the first insulating layer 28, the chromium film 52, the gate insulating film 18, the semiconductor layer 19, and the doped layer 20 are etched with the patterned photoresist film 53 being used as a mask.

More specifically, the chromium film 52 is wet etched, and the silicon dioxide film and silicon nitride film both cooperating to each other to thereby form the gate insulating film 18, and the amorphous silicon layer constituting the semiconductor layer 19 are dry etched.

An aqueous solution containing perchloric hydroacid and cerium (II) nitrate ammonium is used for wet etching the chromium film 52.

The conditions for dry etching the silicon dioxide film and the silicon nitride film are as follows.

Etching gases: fluorine tetrachloride gas and oxygen gas

Gas pressure: 5–300 mTorr

Plasma power: 100–300 W

The conditions for dry etching the amorphous silicon film are as follows.

Etching gases: chlorine gas and oxygen gas

Gas pressure: 5–300 mTorr

Plasma power: 50–200 W

The thus formed thin film transistor 5 and the projections 73 have random cross-sections. A maximum height of the thin film transistor 5 and the projections 73 is equal to 3.7 $\mu$m, which is a sum of a thickness of 700 nm of the thin film transistor 5, a thickness of 2 $\mu$m of the first insulating film 28, and a thickness of 1 $\mu$m of the photoresist film 53.

The photoresist film 53 having been used as a mask remains as it is without removal, and constitute a part of the projections 73. Hence, the process is simplified relative to a conventional process.

Figure 21E:
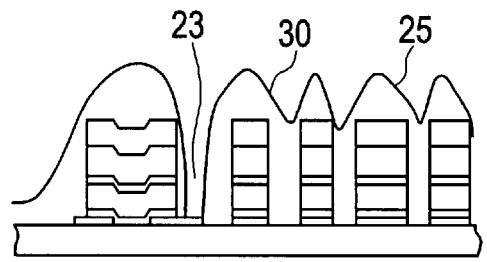
Figure 21F:
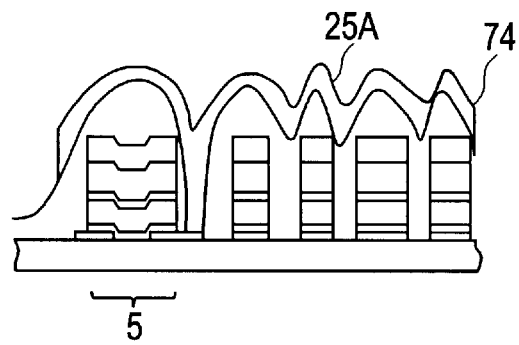

Then, as illustrated in FIG. 21E, a 2 $\mu$m-thick polyimide film 30 from which the second insulating film 30 is composed is deposited entirely over the product resulted from the step illustrated in FIG. 21D. The polyimide film 30 is composed of polyimide commercially available from Nissan Kagaku Co. in the tradename of "RN-812".

The conditions for applying the polyimide film 30 are as follows.

Spin revolution per minute: 800 r.p.m.

Pre-baking temperature: 90 degrees centigrade

Pre-baking time: 10 minutes

Main baking temperature: 250 degrees centigrade

Main baking time: 1 hour

Spin revolution per minute may be set 120 r.p.m. by varying various parameters.

Then, the polyimide film 30 is patterned by third photolithography and etching steps to thereby form a contact hole 23 reaching the source electrode 21. The thus formed second insulating film 30 is formed with the first raised and recessed portions 25.

The conditions for dry etching the polyimide film 30 are the same as the above-mentioned conditions for etching the polyimide film from which the first insulating film 28 is composed.

Then, an aluminum layer is deposited by a thickness of 300 nm by sputtering entirely over the product resulted from the step illustrated in FIG. 21E. The aluminum layer is patterned by fourth photolithography and etching steps to thereby form the light-reflective electrode plate 74 over the second insulating film 30. Specifically, the aluminum film is wet etched in etchant heated up to 60 degrees centigrade and containing phosphoric acid, acetic acid, and nitric acid.

The light-reflective electrode plate 74 is formed so as to have a numerical aperture of 80%.

Though not illustrated, the lower and upper substrates 72A and 72B are designed to include alignment films. Thereafter, the lower substrate 72A and the upper substrate 72B on which the transparent electrode 4 composed of indium-tin-oxide (ITO) are adhered to each other by applying epoxy adhesive to a marginal area of the substrates 72A and 72B so that the layers formed on each of the substrates 72A and 72B face to each other. The substrates 72A and 72B are spaced away from each other by sandwiching spacers such as plastic particles therebetween. Then, GH liquid crystal is introduced into a space formed between the substrates 72A and 72B. Thus, there is completed a liquid crystal display.

The light-reflective electrode plate 74 has uniform reflection characteristic including superior light-scattering characteristic. Thus, the reflection type liquid crystal display in accordance with example 1 provides white display which is brighter than newspaper. Hence, a reflection type liquid crystal display having superior display characteristic can be accomplished at low costs. In addition, a color reflection type liquid crystal display can be also accomplished at low costs by providing an RGB color filter on the upper substrate 72B.

In example 1, the projections 73 are patterned in any one of steps of patterning a layer or layers constituting the thin film transistor 5. In addition, the patterned photoresist film 53 having been used as a mask partially constitutes the projections 73. Thus, the method of fabricating the reflection type liquid crystal display in accordance with example 1 carries out totally four photolithography and etching steps, which is smaller in number than the conventional method.

A height of the projections 73 is not to be limited to the above-mentioned range. A height of the projections 73 can be controlled by varying thicknesses of the layers 17 to 20 and the first insulating film 28. In particular, a thickness of the first insulating film 28 composed of organic or inorganic material can be varied in wider range than a thickness of the thin film transistor 5 comprised of the layers 17 to 22. Accordingly, orientation in performance of the light-reflective electrode plate 74 can be varied by varying a height of the projections 73.

In example 1, each of the projections 73 is comprised of the chromium film, the silicon dioxide film, the silicon nitride film, the amorphous silicon film, the n-type amorphous silicon film, the chromium film, and the first insulating film 28. However, it should be noted that the projections 73 may be comprised of other combination of films. There are a couple of possible combinations. Hence, a height of the projections 73 can be varied without addition of steps for doing so.

Though the first insulating film 28 is comprised of a polyimide film in example 1, material of which the first insulating film 28 is formed is not to be limited to polyimide. For instance, the first insulating film 28 may be composed of silica such as one commercially available from Tore in the tradename of "PSB", acrylate resin such as one commercially available from Nippon Gosei Gomu in the tradename of "MFR 305", or SOG such as one commercially available from Sumitomo Kagaku in the tradename of "SF 9214".

Modification may be made to the above-mentioned example 1.

In the above-mentioned example 1, each of the projections 73 is comprised of the chromium film, the silicon dioxide film, the silicon nitride film, the amorphous silicon film, the n-type amorphous silicon film, the chromium film, and the first insulating film 28. However, the projections 73 may be comprised of any one the following combinations:

(a) a single chromium layer;

(b) a chromium layer and the first insulating film 28 composed of organic material;

(c) a chromium film, an n-type amorphous silicon film, an amorphous silicon film, a silicon nitride film, a silicon dioxide film, a silicon nitride film, and a chromium film; and (d) a chromium film, an n-type amorphous silicon film, an amorphous silicon film, a silicon nitride film, a silicon dioxide film, a silicon nitride film, a chromium film, and the first insulating film 28 composed of organic material.

By composing the projections 73 of any one of the above-mentioned combinations, it is possible to provide better light-scattering characteristic to the light-reflective electrode plate 74. In addition, the projections 73 can be tapered at a sidewall thereof by varying photolithography conditions, ensuring enhanced light-scattering characteristic of the light-reflective electrode plate 74.

EXAMPLE 2

Example 2 is the same as the above-mentioned example 1 except that the first insulating film 28 and the second insulating film 30 are both composed of photosensitive material.

FIGS. 22A to 22F are cross-sectional views of a reflection type liquid crystal display in accordance with example 2, illustrating respective steps of a method of fabricating the same.

The reflection type liquid crystal display in accordance with example 2 is fabricated concurrently with the fabrication of a thin film transistor having a forward stagger structure.

Figure 22A:
FIGS. 22A to 22F are cross-sectional views of a reflection type liquid crystal display in accordance with example 2, illustrating respective steps of a method of fabricating the same.

First, as illustrated in FIG. 22A, a chromium film is deposited on the insulating substrate 35A by sputtering. Then, the chromium film is patterned into the source and drain electrodes 21 and 22 by first photolithography and wet etching steps.

Figure 22B:
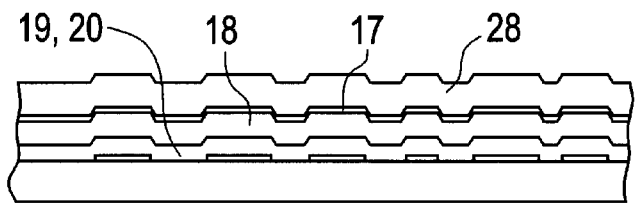

Then, as illustrated in FIG. 22B, a doped layer 20, a semiconductor layer 19, and a gate insulating film 18 are deposited on the insulating substrate 35A by plasma-enhanced chemical vapor deposition.

Herein, the gate insulating film 18 is composed of a silicon dioxide film and a silicon nitride film. The semiconductor layer 19 is composed of amorphous silicon, and the doped layer 20 is composed of n-type amorphous silicon.

Then, a chromium film 17 from which a gate electrode is formed is deposited by sputtering entirely over the gate insulating film 18.

Then, a photosensitive insulating film 28 from which the first insulating film 28 is formed is deposited by spin coating entirely over the chromium film 17.

Figure 22C:
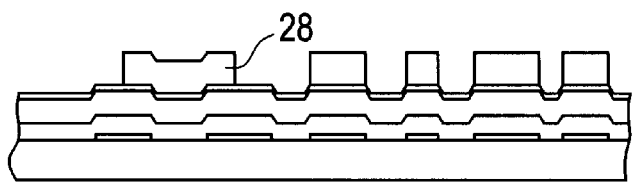

Then, as illustrated in FIG. 22C, the first insulating film 28 is patterned into a pattern for forming the thin film transistor 5 and the projections 73, by second photolithography and etching steps.

Figure 22D:
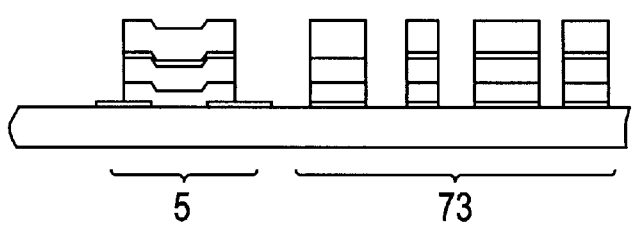

Then, as illustrated in FIG. 22D, the chromium film 17, the gate insulating film 18, the semiconductor layer 19, and the doped layer 20 are dry etched with the patterned first insulating film 28 being used as a mask.

Figure 22E:
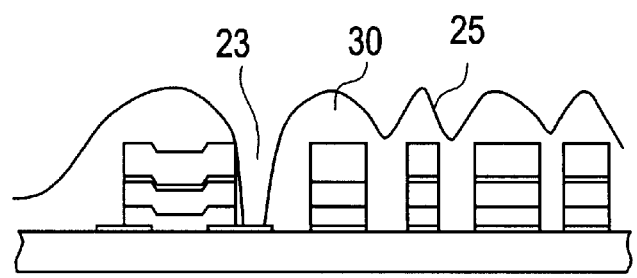
Figure 22F:
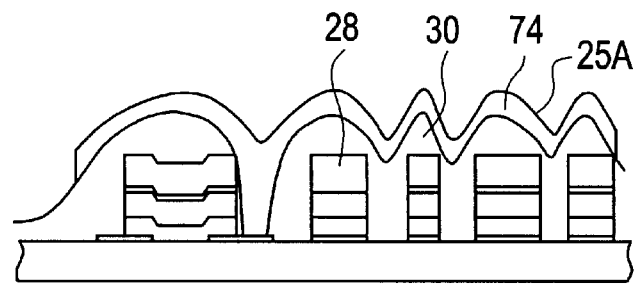

Then, as illustrated in FIG. 22E, a photosensitive insulating film 30 from which the second insulating film 30 is formed is deposited entirely over the product resulted from the step illustrated in FIG. 22D.

Then, the second insulating film 30 is patterned by third photolithography and etching steps to thereby form a contact hole 23 reaching the source electrode 21. The thus formed second insulating film 30 is formed with the first raised and recessed portions 25.

Then, an aluminum layer is deposited by sputtering entirely over the product resulted from the step illustrated in FIG. 22E. The aluminum layer is patterned by fourth photolithography and etching steps to thereby form the light-reflective electrode plate 74 over the second insulating film 30.

In accordance with example 2, the lower substrate 72A of the reflection type liquid crystal display can be fabricated by carrying out four photolithography and etching steps. As mentioned earlier, the first and second insulating films 28 and 30 are composed of photosensitive material. For these reasons, it is no longer necessary to carry out a step of removing a photoresist film after patterning the layers, which ensures the less number of fabrication steps than the conventional method.

In example 2, the photosensitive insulating layer from which the first and second insulating films 28 and 30 are formed is commercially available from Tokyo Ouka in the tradename of "OFPR 800". Other photosensitive insulating layers may be used for forming the first and second insulating films 28 and 30, regardless of whether they are organic or inorganic.

EXAMPLE 3

Example 3 is different from the above-mentioned example 2 in that the first insulating film 28 is composed of organic or inorganic insulating material which can be thermally melted, and that the first insulating film 28 is tapered at a sidewall thereof and further rounded at a summit thereof.

FIGS. 23A to 23G are cross-sectional views of a reflection type liquid crystal display in accordance with example 3, illustrating respective steps of a method of fabricating the same.

Figure 23A:
FIGS. 23A to 23G are cross-sectional views of a reflection type liquid crystal display in accordance with example 3, illustrating respective steps of a method of fabricating the same.
Figure 23B:
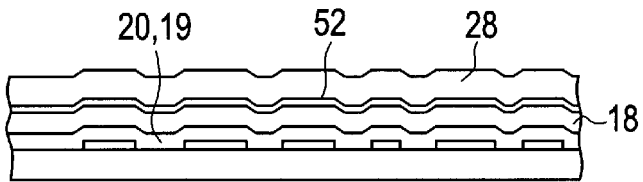
Figure 23C:
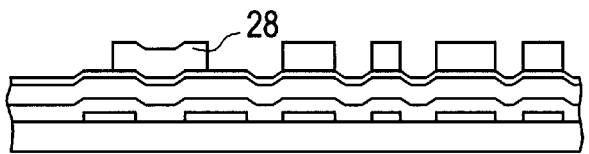
Figure 23D:
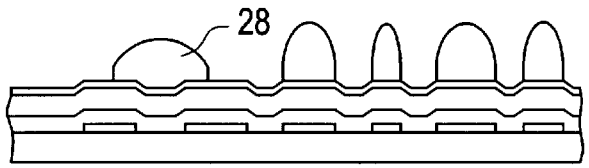
Figure 23E:
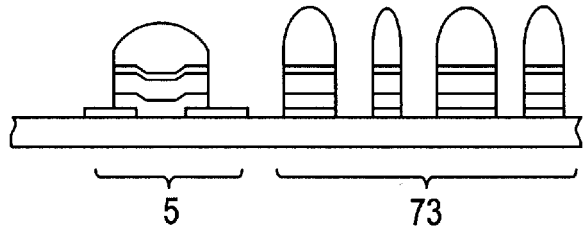
Figure 23F:
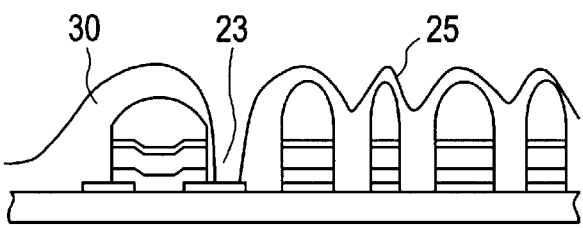
Figure 23G:
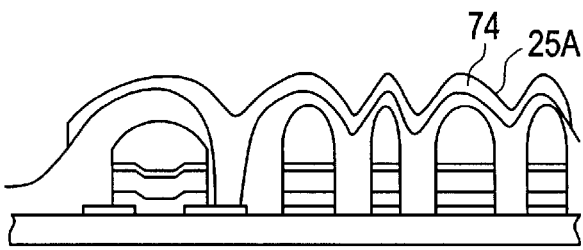

The method illustrated in FIGS. 23A to 23G is different from the method illustrated in FIGS. 22A to 22F only in additionally including the step illustrated in FIG. 23D. That is, after the first insulating film 28 has been patterned, as illustrated in FIG. 23C, the patterned first insulating film 28 is burned at 200 degrees centigrade to thereby taper a sidewall of the first insulating film 28 and make a summit of the first insulating film 28 rounded.

In accordance with example 3, the number of photolithography steps for fabricating the lower substrate 72A of a reflection type liquid crystal display is four, similarly to the above-mentioned examples 1 and 2.

Since the first insulating film 28 is composed of material having thermally melting characteristic, a summit of the first insulating film 28 can be made rounded to thereby reduce an area of flat portions, by appropriately setting a burning temperature, resulting in reduction in regular reflection and hence enhancement in reflection ability.

In example 3, the first insulating film 28 is composed of material commercially available from Tokyo Ouka in the tradename of "TMR-P3". As an alternative, the first insulating film 28 may be composed of material commercially available from Tokyo Ouka in the tradename of "OFPR-800".

After the first insulating film 28 has been patterned, the first insulating film 28 is heated at 200 degrees centigrade for 10 minutes, for instance. Irregularity formed at a summit of the first insulating film 28 (see FIG. 23C) in the thin film transistor 5 is melted, and as a result, a summit of the first insulating film 28 is turned to be rounded, as illustrated in FIG. 23D.

Thus, it is possible to provide the light-reflected electrode plate 74 having desired reflection characteristic by controlling a shape, arrangement, and fabrication conditions of the thin film transistor 5 and the projections 73. For instance, the fabrication conditions include thicknesses of layers, pre-burning temperature, location, size, post-burning temperature, and burning time.

Even if the first insulating film 28 is not composed of material which is thermally melted, a reflection type liquid crystal display having the same display performance as example 3 can be accomplished by tapering the first insulating film 28 at a sidewall thereof When the first insulating film 28 is composed of photosensitive material, a taper angle of a sidewall of the first insulating film 28 can be controlled by varying conditions of exposure and development in a photolithography and etching step.

EXAMPLE 4

FIGS. 24A to 24G are cross-sectional views of a reflection type liquid crystal display in accordance with example 4, illustrating respective steps of a method of fabricating the same.

The reflection type liquid crystal display in accordance with example 4 is fabricated concurrently with the fabrication of a thin film transistor having a forward stagger structure.

Figure 24A:
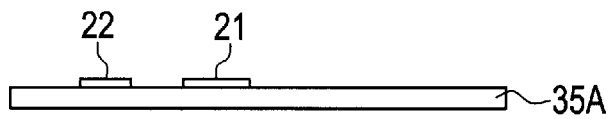
FIGS. 24A to 24G are cross-sectional views of a reflection type liquid crystal display in accordance with example 4, illustrating respective steps of a method of fabricating the same.

First, as illustrated in FIG. 24A, a chromium film is deposited on the insulating substrate 35A by sputtering. Then, the chromium film is patterned into the source and drain electrodes 21 and 22 by first photolithography and etching steps.

Figure 24B:
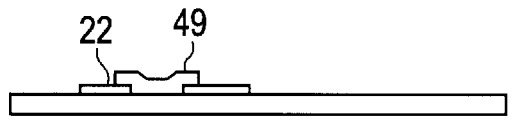

Then, as illustrated in FIG. 24B, a doped layer 20, a semiconductor layer 19, and a gate insulating film 18 are deposited on the insulating substrate 35A by plasma-enhanced chemical vapor deposition.

Herein, the gate insulating film 18 is composed of a silicon nitride film. The semiconductor layer 19 is composed of amorphous silicon, and the doped layer 20 is composed of n-type amorphous silicon.

Then, the layers 18 to 20 are patterned into an island 49 by second photolithography and etching steps.

Figure 24C:
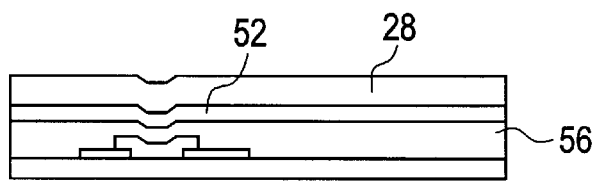

Then, as illustrated in FIG. 24C, a silicon nitride film 56, a chromium film 52, and a first photosensitive insulating film 28 from which the first insulating film 28 is formed are deposited in this order over the product illustrated in FIG. 24B.

Figure 24D:
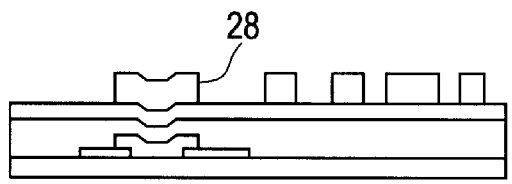

Then, the first photosensitive insulating film 28 is patterned into a pattern of the thin film transistor 5 and the projections 73 by third photolithography and etching steps, as illustrated in FIG. 24D.

Figure 24E:
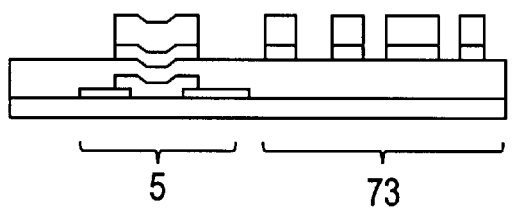

Then, as illustrated in FIG. 24E, the chromium film 52 is etched with the thus patterned first photosensitive insulating film 28 being used as a mask, to thereby form a gate electrode of the thin film transistor 5, and the projections 73.

Figure 24F:
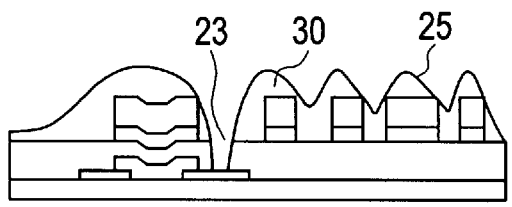
Figure 24G:
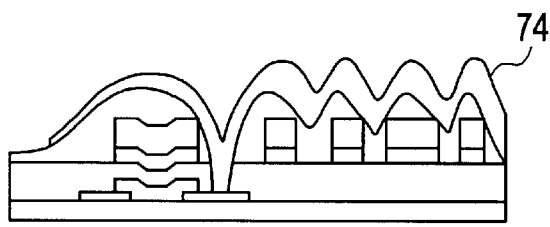

Then, as illustrated in FIG. 24F, a polyimide film 30 from which the second insulating film 30 is composed is deposited entirely over the product resulted from the step illustrated in FIG. 24E.

Then, the polyimide film 30 is patterned by fourth photolithography and etching steps to thereby form a contact hole 23 reaching the source electrode 21. The thus formed second insulating film 30 is formed with the first raised and recessed portions 25.

Then, an aluminum layer is deposited by sputtering entirely over the product resulted from the step illustrated in FIG. 24F. The aluminum layer is patterned by fifth photolithography and etching steps to thereby form the light-reflective electrode plate 74 over the second insulating film 30.

The lower substrate 72A and the upper substrate 72B are adhered to each other by applying epoxy adhesive to a marginal area of the substrates 72A and 72B so that the layers formed on each of the substrates 72A and 72B face to each other. The substrates 72A and 72B are spaced away from each other by sandwiching spacers such as plastic particles therebetween. Then, GH liquid crystal is introduced into a space formed between the substrates 72A and 72B. Thus, there is completed a liquid crystal display.

It has been confirmed that the thus fabricated reflection type liquid crystal display in accordance with example 4 provides white display which is almost equal in brightness to newspaper.

The number of photolithography and etching steps necessary for fabricating the reflection type liquid crystal display in accordance with the above-mentioned example 4 is five. Materials of which the layers constituting the thin film transistor 5 are composed are not to be limited to the above-mentioned materials. The layers constituting the thin film transistor 5 may be composed of other materials.

Though the first and second insulating films 28 and 30 are composed of polyimide in example 4, they may be composed of other organic or inorganic insulating materials.

In addition, similarly to example 3, the first insulating film 28 may be composed of material which is thermally melted, in which case, a summit of the first insulating film 28 can be made rounded, ensuring the first raised and recessed portions 25 would have a smooth surface with the result that the light-reflective electrode plate 74 could have improved light-scattering characteristic.

EXAMPLE 5

FIGS. 25A to 25G are cross-sectional views of a reflection type liquid crystal display in accordance with example 5, illustrating respective steps of a method of fabricating the same.

The reflection type liquid crystal display in accordance with example 5 is fabricated concurrently with the fabrication of a thin film transistor having a reverse stagger structure.

Figure 25A:
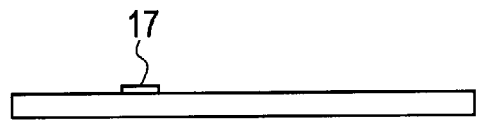
FIGS. 25A to 25G are cross-sectional views of a reflection type liquid crystal display in accordance with example 5, illustrating respective steps of a method of fabricating the same.

First, as illustrated in FIG. 25A, a metal film is deposited on the insulating substrate 35A. Then, the metal film is patterned into a gate electrode 17 by first photolithography and etching steps.

Figure 25B:
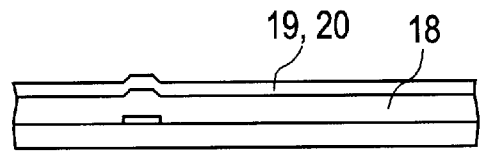

Then, as illustrated in FIG. 25B, a doped layer 20, a semiconductor layer 19, and a gate insulating film 18 are deposited on the insulating substrate 35A by plasma-enhanced chemical vapor deposition.

Figure 25C:
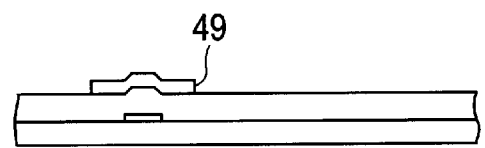

Then, the layers 19 and 20 are patterned into an island 49 by second photolithography and etching steps, as illustrated in FIG. 25C.

Figure 25D:
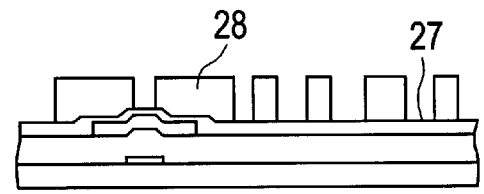

Then, as illustrated in FIG. 25D, a metal film 27 and an organic or inorganic insulating film 28 from which the first insulating film 28 is formed are deposited entirely over the product illustrated in FIG. 25C. Thereafter, the first insulating film 28 is patterned into a pattern of the thin film transistor 5 and the projections 73 by third photolithography and etching steps.

Figure 25E:
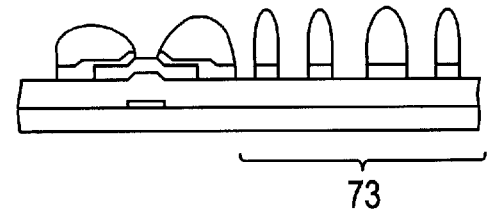

Then, as illustrated in FIG. 25E, the metal film 27 is etched with the thus patterned first insulating film 28 being used as a mask, to thereby form source and drain electrodes of the thin film transistor 5, and the projections 73.

Figure 25F:
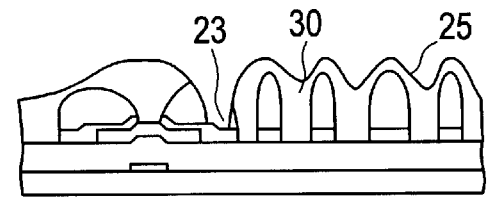

Then, as illustrated in FIG. 25F, an organic or inorganic insulating film 30 from which the second insulating film 30 is formed is deposited entirely over the product resulted from the step illustrated in FIG. 25E.

Then, the second insulating film 30 is patterned by fourth photolithography and etching steps to thereby form a contact hole 23 reaching the source electrode. The thus formed second insulating film 30 is formed with the first raised and recessed portions 25.

Figure 25G:
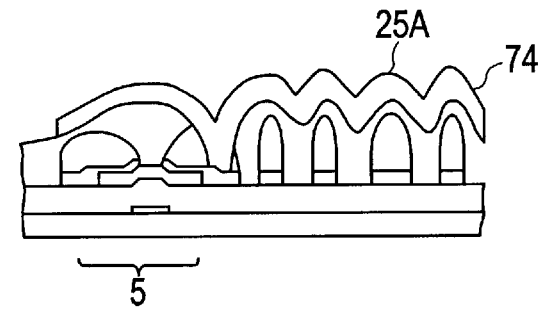

Then, an aluminum layer is deposited by sputtering entirely over the product resulted from the step illustrated in FIG. 25F. The aluminum layer is patterned by fifth photolithography and etching steps to thereby form the light-reflective electrode plate 74 over the second insulating film 30, as illustrated in FIG. 25G.

The number of photolithography and etching steps necessary for fabricating the reflection type liquid crystal display in accordance with the above-mentioned example 5 is five, whereas the number of the same in a conventional method is six. Hence, the method of fabricating the reflection type liquid crystal display in accordance with example 5 can be simplified relative to a conventional one.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-59475 filed on Mar. 11, 1998 including specification, claims, drawings and summary is incorporated herein by reference in its entirety.

What is claimed is:

1. A reflection type liquid crystal display comprising:
   (a) a first substrate;
   (b) a second substrate having a transparent electrode formed thereon in facing relation to said first substrate; and
   (c) a liquid crystal layer sandwiched between said first and second substrates, said first substrate including:
      (a1) an insulating substrate;
      (a2) a switching device fabricated on said insulating substrate;
      (a3) at least one projection projecting towards said second substrate and formed on said insulating substrate in a line with said switching device;
      (a4) a first insulating film formed on top of both said switching device and said projection and patterned to conform to said switching device and said projection, wherein said first insulating comprises a continuous layer covering said switching device and a continuous layer covering said projection;
      (a5) a second insulating film covering said first insulating film on both said switching device and said projection therewith and having first raised and recessed portions formed in accordance with height of said switching device and said projection; and
      (a6) a light-reflective plate formed over said second insulating film and having second raised and recessed portions formed over said first raised and recessed portions, said switching device being in electrical connection with said light-reflective plate.

2. The reflection type liquid crystal display as set forth in claim 1, wherein said first insulating film is tapered at a sidewall thereof.

3. The reflection type liquid crystal display as set forth in claim 1, wherein said first insulating film is rounded at a top thereof.

4. The reflection type liquid crystal display as set forth in claim 1, wherein said switching device includes a third insulating film composed of the same material as that of said first insulating film, and wherein said projection has a multi-layered structure including at least one of a metal film, a fourth insulating film, and a semiconductor film, and said first insulating film formed thereon, said at least one of a metal film, a fourth insulating film, and a semiconductor film being composed of the same material as a material of which a layer constituting said switching device is composed.

5. The reflection type liquid crystal display as set forth in claim 1, wherein said first insulating film is composed of photosensitive material.

6. The reflection type liquid crystal display as set forth in claim 1, wherein said switching device has the same height as a height of said projection.

7. The reflection type liquid crystal display as set forth in claim 1, wherein said first insulating film has a portion on said projection, said portion having a cross-sectional area decreasing towards said second substrate.

8. The reflection type liquid crystal display as set forth in claim 1, wherein said second insulating film is composed of photosensitive material.

9. The reflection type liquid crystal display as set forth in claim 1, wherein said light-reflective plate is formed only above said projection.

10. The reflection type liquid crystal display as set forth in claim 1, wherein said projection is pillar-shaped.

11. The reflection type liquid crystal display as set forth in claim 10, wherein said projection is spaced away from adjacent projection by a distance in the range of 3 $\mu$m to 20 $\mu$m both inclusive.

12. The reflection type liquid crystal display as set forth in claim 1, wherein said projection is strip-shaped.

13. The reflection type liquid crystal display as set forth in claim 1, wherein said projection has a height in the range of 0.4 $\mu$m to 4 $\mu$m both inclusive.

14. The reflection type liquid crystal display as set forth in claim 1, wherein said second insulating film has a thickness in the range of 0.6 $\mu$m to 4 $\mu$m both inclusive.

15. The reflection type liquid crystal display as set forth in claim 1, wherein said switching device is comprised of a thin film transistor.

16. The reflection type liquid crystal display as set forth in claim 15, wherein said thin film transistor is of forward stagger type.

17. The reflection type liquid crystal display as set forth in claim 15, wherein said thin film transistor is of reverse stagger type.

18. The reflection type liquid crystal display as set forth in claim 1, wherein said switching device is comprised of a metal/insulator/metal (MIM) diode.

19. The reflection type liquid crystal display as set forth in claim 1, wherein said first insulating film is composed of thermally melting or contracting material.

20. A method of fabricating a reflection type liquid crystal display, comprising the steps of:
   (a) forming at least one of a metal film, a first insulating film, and a semiconductor film on an insulating substrate;
   (b) forming a continuous second insulating film over said at least one of a metal film, a first insulating film, and a semiconductor film;
   (c) patterning both said second insulating film and said at least one of a metal film, a first insulating film, and a semiconductor film to thereby form a switching device and at least one projection on said insulating substrate;
   (d) forming a third insulating film covering both said switching device and said projection therewith and having first raised and recessed portions formed in accordance with height of said switching device and said projection; and
   (e) forming a light-reflective plate over said third insulating film, said light-reflective plate having second raised and recessed portions formed over said first raised and recessed portions.

21. The method as set forth in claim 20, further comprising the step of tapering said second insulating film at a sidewall thereof.

22. The method as set forth in claim 20, further comprising the step of making said second insulating film rounded at a top thereof.

23. The method as set forth in claim 20, wherein said switching device is formed in said step (c) so that it has the same height as a height of said projection.

24. The method as set forth in claim 20, wherein said third insulating film is formed in said step (d) so that a portion thereof on said projection has a cross-sectional area decreasing towards said second substrate.

25. The method as set forth in claim 20, wherein said light-reflective plate is formed only above said projection in said step (e).

26. The method as set forth in claim 20, wherein said projection is formed in said step (c) to be pillar-shaped.

27. The method as set forth in claim 20, wherein said projection is formed in said step (c) to be strip-shaped.

* * * * *